(12) United States Patent
Jung et al.

(10) Patent No.: US 11,823,838 B2
(45) Date of Patent: *Nov. 21, 2023

(54) TWO-DIMENSIONAL PEROVSKITE MATERIAL, DIELECTRIC MATERIAL AND MULTI-LAYERED CAPACITOR INCLUDING THE SAME

(71) Applicant: SAMSUNG ELECTRONICS CO., LTD., Suwon-si (KR)

(72) Inventors: Doh Won Jung, Seoul (KR); Jong Wook Roh, Anyang-si (KR); Daejin Yang, Yeongju-si (KR); Chan Kwak, Yongin-si (KR); Hyungjun Kim, Suwon-si (KR); Woojin Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1528 days.

This patent is subject to a terminal disclaimer.

(21) Appl. No.: 15/908,229

(22) Filed: Feb. 28, 2018

(65) Prior Publication Data

US 2018/0286586 A1    Oct. 4, 2018

(30) Foreign Application Priority Data

Mar. 31, 2017    (KR) .................. 10-2017-0042201

(51) Int. Cl.
*H01G 4/12* (2006.01)
*H01G 4/30* (2006.01)
(Continued)

(52) U.S. Cl.
CPC .......... *H01G 4/1281* (2013.01); *C01G 33/006* (2013.01); *C04B 35/4682* (2013.01);
(Continued)

(58) Field of Classification Search
CPC .......... C07C 211/01; H01G 4/14; H01G 4/30; C01P 2002/34; C01P 2004/24;
(Continued)

(56) References Cited

U.S. PATENT DOCUMENTS 4,309,295 A    1/1982  McSweeney
4,362,637 A    12/1982 Matsuo et al.
(Continued)

FOREIGN PATENT DOCUMENTS

CN    1527331 A    9/2004
CN    105431955 A    3/2016
(Continued)

OTHER PUBLICATIONS

Osada et al , "Rwo-Dimensional Doelectric Nanosheets: Novel Nanoelectronics From Nanocrystal Building Blocks", Adv. Mater., 201, 24, pp. 210-228.*

(Continued)

*Primary Examiner* — C Melissa Koslow
(74) *Attorney, Agent, or Firm* — CANTOR COLBURN LLP

(57) ABSTRACT

A two-dimensional perovskite material, a dielectric material including the same, and a multi-layered capacitor. The two-dimensional perovskite material includes a layered metal oxide including a first layer having a positive charge and a second layer having a negative charge which are laminated, a monolayer nanosheet exfoliated from the layered metal oxide, a nanosheet laminate of a plurality of the monolayer nanosheets, or a combination thereof, wherein the two-dimensional perovskite material a first phase having a two-dimensional crystal structure is included in an amount of greater than or equal to about 80 volume %, based on 100
(Continued)

volume % of the two-dimensional perovskite material, and the two-dimensional perovskite material is represented by Chemical Formula 1.

22 Claims, 16 Drawing Sheets

(51) Int. Cl.
    *C01G 33/00*     (2006.01)
    *C04B 35/495*     (2006.01)
    *H01G 4/33*     (2006.01)
    *C04B 35/468*     (2006.01)
    *H01G 4/232*     (2006.01)
    *H01G 4/242*     (2006.01)

(52) U.S. Cl.
    CPC ......... *C04B 35/495* (2013.01); *H01G 4/1218* (2013.01); *H01G 4/1227* (2013.01); *H01G 4/1236* (2013.01); *H01G 4/30* (2013.01); *H01G 4/33* (2013.01); *C01P 2002/34* (2013.01); *C01P 2002/50* (2013.01); *C01P 2002/72* (2013.01); *C01P 2002/78* (2013.01); *C01P 2004/03* (2013.01); *C01P 2004/24* (2013.01); *C01P 2006/40* (2013.01); *C04B 2235/3201* (2013.01); *C04B 2235/3208* (2013.01); *C04B 2235/3213* (2013.01); *C04B 2235/3215* (2013.01); *C04B 2235/3227* (2013.01); *C04B 2235/3255* (2013.01); *C04B 2235/5292* (2013.01); *C04B 2235/768* (2013.01); *C04B 2235/80* (2013.01); *C04B 2235/85* (2013.01); *H01G 4/232* (2013.01); *H01G 4/242* (2013.01)

(58) Field of Classification Search
CPC . C01P 2006/40; C01G 33/006; C01G 19/006; C01G 21/006; C01G 23/002; C01G 25/006; C01G 27/006; C01G 31/006; C01G 35/006; C01G 37/06; C01G 39/006; C01G 41/006; C04B 34/495; C04B 34/48; C04B 34/49; C04B 34/453; C04B 34/42
See application file for complete search history.

(56) References Cited

U.S. PATENT DOCUMENTS

| | | | |
|---|---|---|---|
| 4,403,236 A | 9/1983 | Mandai et al. | |
| 5,509,558 A | 4/1996 | Imai et al. | |
| 5,638,252 A | 6/1997 | Drab et al. | |
| 5,753,934 A | 5/1998 | Yano et al. | |
| 5,757,610 A | 5/1998 | Wada et al. | |
| 5,801,105 A | 9/1998 | Yano et al. | |
| 5,804,823 A | 9/1998 | Ramer et al. | |
| 6,143,679 A | 11/2000 | Nagasawa et al. | |
| 6,207,082 B1 | 3/2001 | Suzuki et al. | |
| 6,292,355 B1 | 9/2001 | Kang et al. | |
| 6,795,296 B1 | 9/2004 | Palanduz et al. | |
| 6,900,977 B2 | 5/2005 | Nakamura et al. | |
| 7,911,927 B2 | 3/2011 | Koinuma et al. | |
| 8,184,426 B2 | 5/2012 | Osada et al. | |
| 8,885,322 B2 | 11/2014 | Chai | |
| 9,187,842 B2 | 11/2015 | Nakajima et al. | |
| 9,543,500 B2 | 1/2017 | Osada et al. | |
| 9,656,878 B2 | 5/2017 | Yashima et al. | |
| 9,742,005 B2 | 8/2017 | Choi et al. | |
| 11,358,904 B2* | 6/2022 | Roh | C01G 35/006 |
| 2010/0226067 A1* | 9/2010 | Osada | H01L 21/022 156/60 |
| 2011/0147060 A1 | 6/2011 | Osada et al. | |
| 2012/0217615 A1 | 8/2012 | Tatekawa | |
| 2012/0270720 A1 | 10/2012 | Tanabe | |
| 2013/0065065 A1 | 3/2013 | Nakajima et al. | |
| 2013/0234293 A1 | 9/2013 | Kawamoto | |
| 2013/0286541 A1 | 10/2013 | Kawamoto | |
| 2016/0087274 A1* | 3/2016 | Nakayama | H01M 4/485 429/231.9 |
| 2016/0141111 A1 | 5/2016 | Sato et al. | |

FOREIGN PATENT DOCUMENTS

| | | |
|---|---|---|
| EP | 0634756 A2 | 1/1995 |
| JP | 1997110592 A | 4/1997 |
| JP | 2011184274 A | 9/2011 |
| JP | 2014-144904 * | 8/2014 |
| JP | 2014144904 A | 8/2014 |
| JP | 2014152052 A | 8/2014 |
| JP | 2015046582 A | 3/2015 |
| JP | 2015119184 A | 6/2015 |
| KR | 940011059 B1 | 11/1994 |
| KR | 1020120091655 A | 8/2012 |
| KR | 1020140049190 A | 4/2014 |
| KR | 1398553 B1 | 5/2014 |
| KR | 101405078 B1 | 6/2014 |
| KR | 1020150024761 A | 3/2015 |
| KR | 101522666 B1 | 5/2015 |
| KR | 1020150061014 A | 6/2015 |
| KR | 1020160080866 A | 7/2016 |
| WO | 2015056558 A1 | 4/2015 |

OTHER PUBLICATIONS

Maeda et al., "Perovskite Oxide Nanosheets with Tunable Band-Edge Potentials and High Photocatalytic Hydrogen-Evolution Activity", Angew. Chem. Int> Ed., 2014, 53, pp. 13164-13168.*
Translation for JP 2014-144904, Aug. 2014.*
Extended European Search Report dated Jun. 22, 2018, of the corresponding European Patent Application No. 18152527.0.
Fukunaga et al., "Ferroelectricity in Layered Perovskites as a Model of Ultra-Thin Films", World Journal of Condensed Matter Physics, 6, 2016, pp. 224-243.
Li et al., "Solution-Based Fabrication of Perovskite Nanosheet Films and Their Dielectric Properties", Japanese Journal of Applied Physics, 48, 2009, 09KA15 pp. 1-5.
Liu et al., "A New n=4 Layered Ruddlesden-Popper Phase K2.5Bi2.5Ti4O13 Showing Stoichiometric Hydration", Inorganic Chemistry, 55, 2016, pp. 1403-1411.
Schaak et al., "Perovskites by Design: A Toolbox of Solid-State Reactions", Chem. Mater. vol. 14, 2002. 1455-1471.
Schaak et al., "Prying Apart Ruddlesden-Popper Phases: Exfoliation into Sheets and Nanotubes for Assembly of Perovskite Thin Films", Chem. Mater. vol. 12, 2000, pp. 3427-3434.
Office Action dated May 17, 2021 of the corresponding Korean Patent Application No. 10-2017-0042201.
Korean Office Action for Korean Patent Application No. 10-2017-0030659 dated Jan. 20, 2021.
Extended European Search Report dated Aug. 1, 2018, of the corresponding European Patent Application No. 18164562.3.
Maeda K et al., "Perovskite oxide nanosheets with tunable band-edge potentials and high photocatalytic hydrogen- evolution activity", Angewandte Chemie, Sep. 26, 2014, pp. 13164-13168, vol. 53.
Minoru Osada et al., "A- and B-Site Modified Perovskite Nanosheets and Their Integrations into High-k Dielectric Thin Films", Applied Ceramic Technology, Dec. 5, 2011, pp. 29-36, vol. 9, Issue 1.
Office Action for Chinese Patent Application No. 201810269346.X dated Mar. 30, 2021.
Christian Ziegler et al., "Two-Dimensional Transition Metal Oxide Nanosheets for Nanoarchitectonics," 2015, . Dissertation, LMU Munchen: Faculty of Chemistry and Pharmacy; maximilians university, pp. 1-230.
Office Action dated Aug. 24, 2021 of the KR Patent Application No. 10-2017-0030660.
Woong-Hee Lee et al., "Synthesis of Sr2Nb3O10 nanosheets and their application for growth of thin film using an electrophoretic method," J Am Ceram Soc., 2017, pp. 1098-1107, vol. 100.

(56) References Cited

OTHER PUBLICATIONS

Final Office Action dated Nov. 29, 2021 in U.S. Appl. No. 15/908,193.
Funakubo, Hiroshi. "Degradation-free dielectric property using bismuth layer-structured dielectrics having natural superlattice structure." Journal of the Ceramic Society of Japan 116.1360 (2008): 1249-1254.
Fukunaga et al. "Ferroelectricity in Layered Perovskites as a Model of Ultra-Thin Films," World Journal of Condensed Matter Physics 6.3 (2016): 224-243 (Year: 2016).
Non-Final Office Action dated Jul. 12, 2021 in U.S. Appl. No. 15/908,193.
Notice of Allowance dated Mar. 23, 2022 of the corresponding Korean Patent Application No. 10-2017-0030660.
Minoru Osada, et al., "Two-Dimensional Dielectric Nanosheets: Novel Nanoelectronics from Nanocrystal Building Blocks", Adv. mater. 2012, 24, 210-228.
Notice of Allowance dated Oct. 27, 2021, of the corresponding Korean Patent Application No. KR 10-2017-0042201.

\* cited by examiner

TWO-DIMENSIONAL PEROVSKITE MATERIAL, DIELECTRIC MATERIAL AND MULTI-LAYERED CAPACITOR INCLUDING THE SAME

CROSS-REFERENCE TO RELATED APPLICATION

This application claims priority to Korean Patent Application No. 10-2017-0042201, filed on Mar. 31, 2017, and all the benefits accruing therefrom under 35 U.S.C. § 119, the content of which in its entirety is herein incorporated by reference.

BACKGROUND

1. Field

A two-dimensional perovskite material, a dielectric material including the same, and a multi-layered capacitor are disclosed.

2. Description of the Related Art

A multi-layer ceramic condenser (MLCC), which is a small-size condenser having a large capacity, is an electronic device obtained by alternately laminating a dielectric ceramic composition and an internal electrode and firing the same simultaneously. According to the ongoing requirements for electronic devices to provide a small size, a thin film, and a greater capacity, there remains an increasing need to develop a condenser having further smaller size and greater thinness, and greater capacity than the conventional multi-layered ceramic condenser structure.

In addition, an intergranular insulation type capacitor, of dielectric materials exhibiting good dielectric characteristics may form an intergranular insulation layer between crystal grains having conductivity or semi-conductivity, e.g., conductive or semiconductive crystal grains, so the intergranular insulation type capacitor may have a greater apparent relative permittivity than a conventional multi-layered ceramic condenser including an entirety of the relatively thick ceramic layer as a dielectric layer, and down-sizing and greater capacity may be possible.

An apparent relative permittivity of the intergranular insulation type capacitor tends to be generally proportional to a particle size and inversely proportional to a thickness of the intergranular insulation layer. However, a relative permittivity of the intergranular insulation layer is also decreased with a decreased thickness of the intergranular insulation layer, and the intergranular insulation layer may have problems in that the thickness of the intergranular insulation layer may be maintained in a predetermined range taking into account or considering the relative permittivity of the intergranular insulation type capacitor.

SUMMARY

An embodiment provides a two-dimensional perovskite material having a large relative permittivity even in a region having a thickness of several to several tens of nanometers.

An embodiment provides a dielectric material having improved capacity characteristics as well as realizing a down-size and a thin film by including the two-dimensional perovskite material, and a multi-layered capacitor.

According to an embodiment, a two-dimensional perovskite material includes a layered metal oxide including a first layer having a positive charge and a second layer having a negative charge which are laminated, a monolayer nanosheet exfoliated from the layered metal oxide, a nanosheet laminate of the monolayer nanosheets, or a combination thereof, wherein the two-dimensional perovskite material includes about 80 volume % or greater of a first phase having a two-dimensional crystal structure, based on 100 volume % of the two-dimensional perovskite material, and the two-dimensional perovskite material is represented by Chemical Formula 1.

$$X[A^{11}_{(n-m-1)}A^{12}_{m}B'_{n}O_{(3n+1)}]$$   Chemical Formula 1

In Chemical Formula 1, X includes H, Li, Na, K, Rb, Cs, a cationic compound, or a combination thereof, each of $A^{11}$ and $A^{12}$ includes a metal element having +2 to +3 valence, wherein $A^{12}$ has a larger ion radius than $A^{11}$, B' includes Nb, V, Ta, Ti, Zr, Hf, W, Mo, Cr, Pb, Sn, or a combination thereof, n≥3, m>0, and n−m≠1.

The two-dimensional perovskite material may be represented by Chemical Formula 2a.

$$X[A^{21}_{(n-m-1)}Ba_{m}B'_{n}O_{(3n+1)}]$$   Chemical Formula 2a

In Chemical Formula 2a, X and B are the same as in Chemical Formula 1, $A^{21}$ includes Be, Mg, Ca, Sr, Ra, Pb, La, Ce, Pr, Sm, Eu, Gd, Tb, Dy, Ho, Er, Tm, Yb, Lu, or a combination thereof, n≥3, and 0<m≤1.

The two-dimensional perovskite material may be represented by Chemical Formula 2b.

$$X[Sr_{(n-m-1)}A^{32}_{m}B'_{n}O_{(3n+1)}]$$   Chemical Formula 2b

In Chemical Formula 2b, X and B are the same as in Chemical Formula 1, $A^{32}$ includes Ba Pb, or a combination thereof, n≥3, and 0<m≤1.

The two-dimensional perovskite material may be represented by Chemical Formula 2c.

$$X[A^{41}_{(2-m)}A^{42}_{m}B'_{3whe}O_{10}]$$   Chemical Formula 2c

In Chemical Formula 2c, X and B are the same as in Chemical Formula 1, each of $A^{41}$ and $A^{42}$ includes Be, Mg, Ca, Sr, Ba, Ra, Pb, La, Ce, Pr, Sm, Eu, Gd, Tb, Dy, Ho, Er, Tm, Yb, Lu, or a combination thereof, wherein $A^{42}$ has a larger ion radius than $A^{41}$, and 0<m≤1.

The first phase may be a Dion-Jacobson phase.

X may include the cationic compound, and the cationic compound may include a (C1 to C16 alkyl)ammonium compound, a (C1 to C16 alkyl)amine compound, or a combination thereof.

The cationic compound may include a tetramethyl ammonium compound, a tetraethyl ammonium compound, a tetrapropyl ammonium compound, a tetrabutyl ammonium compound, a methylamine compound, an ethylamine compound, a propylamine compound, a butylamine compound, or a combination thereof.

The first layer of the layered metal oxide may include a proton, an alkali metal ion, or a combination thereof.

The monolayer nanosheet may include a second layer exfoliated from the layered metal oxide.

The monolayer nanosheet may include the cationic compound attached to a surface of the second layer.

A thickness of the monolayer nanosheet may be less than or equal to about 10 nanometers (nm) and the average longitudinal diameter of the monolayer nanosheet may be about 10 nm to about 100 micrometers (μm).

The two-dimensional perovskite material may have a relative permittivity of greater than or equal to about 200 at 1 kilohertz (kHz).

According to an embodiment, a dielectric material includes a plurality of crystal grains including a semiconductor or conductive material; and a grain boundary insulation layer between the crystal grains; wherein the grain boundary insulation layer covers at least a portion of a surface of at least one of the crystal grains and includes a two-dimensional perovskite material represented by Chemical Formula 1 and including about 80 volume % or greater of a first phase having a two-dimensional crystal structure based on 100 volume % of the two-dimensional perovskite material

                                  Chemical Formula 1

In Chemical Formula 1, X includes H, Li, Na, K, Rb, Cs, a cationic compound, or a combination thereof, each of $A^{11}$ and $A^{12}$ includes a metal element having +2 to +3 valence, wherein $A^{12}$ has a larger ion radius than $A^{11}$, B' includes Nb, V, Ta, Ti, Zr, Hf, W, Mo, Cr, Pb, Sn, or a combination thereof, $n \geq 3$, $m > 0$, and $n-m \neq 1$.

The two-dimensional perovskite material may include a layered metal oxide including a first layer having a positive charge and a second layer having a negative charge which are laminated, a monolayer nanosheet exfoliated from the layered metal oxide, a nanosheet laminate of the monolayer nanosheets, or a combination thereof.

The two-dimensional perovskite material may cover an entire surface of the crystal grain.

The cationic compound may include a (C1 to C16 alkyl) ammonium, a (C1 to C16 alkyl)amine compound, or a combination thereof.

The two-dimensional perovskite material may be present in an amount of about 10 volume % to about 100 volume % based on 100 volume % of the grain boundary insulation layer.

The crystal grain may include a barium titanate, strontium titanate, lead titanate, lead zirconate, lead zirconate titanate, or a combination thereof.

According to an embodiment, a multi-layered capacitor includes a laminate structure including an internal electrode and a dielectric layer, wherein the dielectric layer includes a dielectric material including a plurality of crystal grains including a semiconductor or conductive material and a grain boundary insulation layer between the crystal grains, the grain boundary insulation layer covers at least a portion of a surface of at least one of the crystal grains, and the multi-layered capacitor includes a two-dimensional perovskite material represented by Chemical Formula 1 and including about 80 volume % or greater of a first phase having a two-dimensional crystal structure, based on 100 volume % of the two-dimensional perovskite material

                                  Chemical Formula 1

In Chemical Formula 1, X includes H, Li, Na, K, Rb, Cs, a cationic compound, or a combination thereof, each of $A^{11}$ and $A^{12}$ includes a metal elements having +2 to +3 valence, wherein $A^{12}$ has a larger ion radius than $A^{11}$, B' includes Nb, V, Ta, Ti, Zr, Hf, W, Mo, Cr, Pb, Sn, or a combination thereof, $n \geq 3$, $m > 0$, and $n-m \neq 1$.

At least two layers of each of the internal electrode and the dielectric layer may be alternated and laminated.

The dielectric layer may have a thickness of less than about 500 nm and a relative permittivity of greater than or equal to about 4,000.

As the relative permittivity of the two-dimensional perovskite material according to an embodiment does not decrease below a predetermined level even if the thickness thereof is decreased, the two-dimensional perovskite material may provide a dielectric material with an ultra-thin film when using the same as a dielectric material. Thus it may overcome the limits of a comparative intergranular insulation type capacitor, multi-layered capacitor, or the like.

BRIEF DESCRIPTION OF THE DRAWINGS

The above and other advantages and features of this disclosure will become more apparent by describing in further detail exemplary embodiments thereof with reference to the accompanying drawings, in which:

FIG. 15 shows the change in x-axis of the crystal lattice, and FIG. 16 shows the change in y-axis of the crystal lattice.

DETAILED DESCRIPTION

Figure 1:
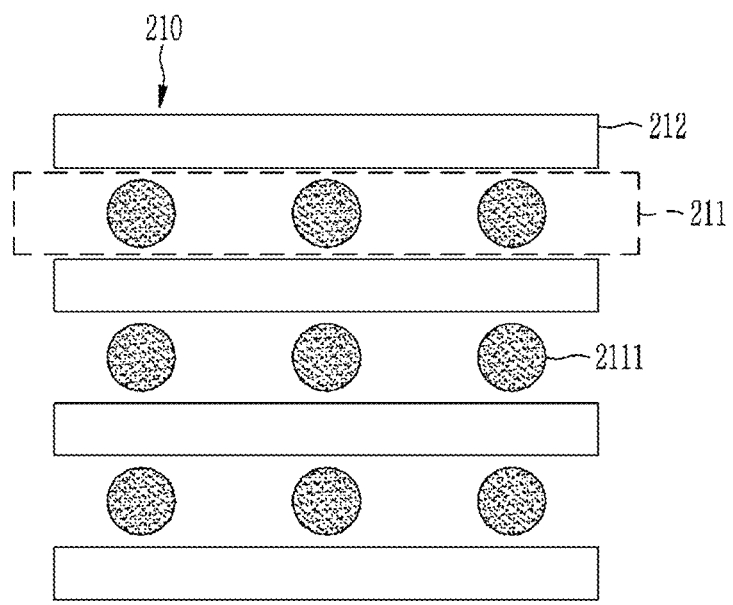
FIG. 1 schematically shows that X is an alkali metal in a two-dimensional perovskite material according to an embodiment, FIG. 2 schematically shows that alkali metal ions are substituted with protons (H$^+$) in a two-dimensional perovskite material according to an embodiment, FIG. 3 schematically shows an embodiment in which at least parts of protons (H$^+$) are substituted with cationic compounds in a two-dimensional perovskite material, FIG. 4 schematically shows a monolayer nanosheet structure in which a cationic compound is attached onto a surface according to an embodiment, FIG. 5 schematically shows a crystal structure of a second layer in a two-dimensional perovskite material according to an embodiment, FIG. 6 schematically shows a dielectric material according to an embodiment, FIG. 7 schematically shows a multi-layered capacitor according to an embodiment, FIG. 8 sequentially shows a process of exfoliating a monolayer nanosheet from a layered metal oxide in a method of manufacturing a two-dimensional perovskite material according to an embodiment.

Advantages and characteristics of this disclosure, and a method for achieving the same, will become evident referring to the following example embodiments together with the drawings attached hereto. However, the embodiments should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising", will be understood to imply the inclusion of stated elements but not the exclusion of any other elements.

Further, the singular includes the plural unless otherwise defined.

In the drawings, the thickness of layers, films, panels, regions, etc., are exaggerated for clarity. Like reference numerals designate like elements throughout the specification.

It will be understood that when a first element such as a layer, film, region, or substrate is referred to as being "on" second element, it can be directly on the other element or intervening elements may also be present. In contrast, when an element is referred to as being "directly on" another element, there are no intervening elements present.

It will be understood that when a first element is referred to as being on a second element, the first element and the second element are adjacent to each other (e.g., being contacted to each other), but the upper or lower site is not limited.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, unless otherwise defined, a "two-dimensional layered material" refers to a material having a two-dimensional crystal structure which is a material, e.g., a sheet or film including one or more layered structures, e.g., 1 to 9 atomic layers.

As used herein, relative permittivity refers to a dielectric constant of a material or the absolute permittivity of a material expressed as a ratio relative to the permittivity of vacuum. According to an embodiment, a perovskite material having a two-dimensional crystal structure is provided. The two-dimensional perovskite material may include a layered metal oxide including a first layer having a positive charge and a second layer having a negative charge which are alternated and laminated, a monolayer nanosheet exfoliated from the layered metal oxide, and a nanosheet laminate including two or more of the monolayer nanosheets, or a combination thereof.

The two-dimensional perovskite material according to an embodiment may be a layered metal oxide, a monolayer nanosheet exfoliated from the layered metal oxide, or a laminate of two or more monolayer nanosheets, or a combination thereof in which at least two thereof are intermixed.

A two-dimensional perovskite material according to an embodiment is represented by Chemical Formula 1.

$$X[A^{11}_{(n-m-1)}A^{12}_{m}B'_{n}O_{(3n+1)}]$$ [Chemical Formula 1]

In Chemical Formula 1, X includes H, Li, Na, K, Rb, Cs, a cationic compound, or a combination thereof, each of $A^{11}$ and $A^{12}$ includes a metal element having +2 to +3 valence, wherein $A^{12}$ has a larger ion radius than $A^{11}$, B' includes Nb, V, Ta, Ti, Zr, Hf, W, Mo, Cr, Pb, Sn, or a combination thereof, n≥3, m>0, and n−m≠1.

According to an embodiment, Chemical Formula 1 may be divided into a positive-charged moiety of X and a negative-charged moiety of $[A^{11}_{(n-m-1)}A^{12}_{m}B'_{n}O_{(3n+1)}]$.

In other words, a two-dimensional perovskite material according to an embodiment may include a first layer including X and a second layer including the $[A^{11}_{(n-m-1)}A^{12}_{m}B'_{n}O_{(3n+1)}]$, and may have a laminate structure including the first layer and the second layer, e.g., a laminate structure including alternating first and second layers, so the two-dimensional perovskite material exhibits electrical neutrality, when viewed as a whole.

In addition, the second layer has a two-dimensional crystal structure formed by metal elements disposed in "A site" summing $A^{11}$ site and $A^{12}$ site and in "B site" together with oxygen atom in Chemical Formula 1. Accordingly, the two-dimensional perovskite material according to an embodiment may include a two-dimensional crystal structure in the second layer.

The second layer may exhibit different two-dimensional crystal structures depending upon a mole ratio of metal elements positioned in the A site and the B site in Chemical Formula 1.

FIG. 1 schematically shows an embodiment in which X is an alkali metal in a two-dimensional perovskite material according to an embodiment.

The two-dimensional perovskite material 210 according to an embodiment may have a two-dimensional crystal structure including a first layer 211 of an assembly layer of alkali metal ions 2111 and a second layer 212 represented by $[A^{11}_{(n-m-1)}A^{12}_{m}B'_{n}O_{(3n+1)}]$, as shown in FIG. 1.

In addition, the two-dimensional perovskite material 210 shown in FIG. 1 may have a structure in which the first layer 211 and the second layer 212 are alternated three or more times and laminated, e.g., the first layer 211 and the second layer 212 include three or more laminated layers. However, the two-dimensional perovskite material 210 according to an embodiment is not necessarily limited to the laminate structure shown in FIG. 1, but may include all layered structures in which the first layer 211 and the second layer 212 are alternated and laminated.

Metal elements having +2 or +3 valance, for example, an alkaline-earth metal element, Pb, La, Ce, Pr, Sm, Eu, Gd, Tb, Dy, Ho, Er, Tm, Yb, Lu may be disposed in each $A^{11}$ site and $A^{12}$ site of the second layer 212. But different metal elements are disposed in each $A^{11}$ site and $A^{12}$ site of Chemical Formula 1. In other words, the metal element disposed in $A^{11}$ site may have a different "ion radius when ionized to +2 or +3 valence" from the metal element disposed in $A^{12}$ site.

According to an embodiment, the metal element disposed in $A^{12}$ site may have larger ion radius than the metal element disposed in $A^{11}$ site. When the metal elements disposed in $A^{11}$ site and $A^{12}$ site satisfy the ion radius conditions, the relative permittivity of the two-dimensional perovskite material 210 may be improved.

For example, a two-dimensional perovskite material according to an embodiment may satisfy Chemical Formula 2a.

$X[A^{21}_{(n-m-)}Ba_m B'_n O_{(3n+1)}]$     [Chemical Formula 2a]

In Chemical Formula 2a, X and B are the same as in Chemical Formula 1, $A^{21}$ includes Be, Mg, Ca, Sr, Ra, Pb, La, Ce, Pr, Sm, Eu, Gd, Tb, Dy, Ho, Er, Tm, Yb, Lu, or a combination thereof, n≥3, and 0<m≤1.

In Chemical Formula 2a, Ba is disposed in $A^{12}$ site of Chemical Formula 1, and a metal element having smaller ion radius than $Ba^{2+}$ when ionized to +2 or +3 valance, for example, an alkaline-earth metal element except Ba, or Pb, Ra, Pb, La, Ce, Pr, Sm, Eu, Gd, Tb, Dy, Ho, Er, Tm, Yb, Lu, or a combination thereof may be disposed in $A^{21}$.

In addition, a mole ratio between the metal elements disposed in $A^{21}$ site and Ba may be, for example, about 1:1 to about 10:1, about 1:1 to about 9:1, about 1:1 to about 8:1, about 1:1 to about 7:1, about 1:1 to about 6:1, or about 1:1 to about 5:1. The mole number of the metal elements disposed in $A^{21}$ site is the same as the mole number of Ba or greater than the mole number of Ba.

Accordingly, the two-dimensional perovskite material 210 according to an embodiment may have a two-dimensional crystal structure in which the metal elements disposed in $A^{21}$ site are mainly occupied in the A site, and Ba is substituted in other regions except $A^{21}$ site in the A site.

A two-dimensional perovskite material according to an embodiment may also satisfy Chemical Formula 2b.

$X[Sr_{(n-m-1)}A^{32}_m B'_n O_{(3n+1)}]$     [Chemical Formula 2b]

In Chemical Formula 2b, X and B are the same as in Chemical Formula 1, $A^{32}$ includes Ba, Pb, or a combination thereof, n≥3, and 0<m≤1.

In Chemical Formula 2b, Sr is disposed in $A^{11}$ site of Chemical Formula 1, and a metal element having a larger ion radius than $Sr^{2+}$ when ionized to +2 or +3 valance, for example, Ba, Pb, or a combination thereof may be disposed in $A^{32}$ site.

A mole ratio between Sr and the metal element disposed in $A^{32}$ site may be determined or varied so that the mole number of Sr is greater than or equal to the mole number of the metal element disposed in $A^{32}$ site, as in Chemical Formula 2a. Thus the two-dimensional crystal structure of $[Sr_{(n-m-1)}A^{32}_m B'_n O_{(3n+1)}]$ may have a two-dimensional crystal structure in which Sr is mainly occupied in an A site, and the elements disposed in $A^{32}$ site are substituted in the other regions of the A site.

A two-dimensional perovskite material according to an embodiment may also satisfy Chemical Formula 2c.

$X[A^{41}_{(2-m)}A^{42}_m B'_3 O_{10}]$     [Chemical Formula 2c]

In Chemical Formula 2c, X and B are the same as in Chemical Formula each of $A^{41}$ and $A^{42}$ includes Be, Mg, Ca, Sr, Ba, Ra, Pb, La, Ce, Pr, Sm, Eu, Gd, Tb, Dy, Ho, Er, Tm, Yb, Lu, or a combination thereof, wherein $A^{42}$ has a larger ion radius than $A^{41}$, and 0<m≤1.

Chemical Formula 2c corresponds to a case of n=3 in Chemical Formula 1, and the mole number of the metal elements disposed in $A^{41}$ site may be greater than or equal to the mole number of the metal elements disposed in $A^{42}$ site, as in Chemical Formula 2a, Chemical Formula 2b. Thus the two-dimensional crystal structure of $X[A^{41}_{(2-m)}A^{42}_m B'_3 O_{10}]$ may have a two-dimensional crystal structure in which the metal elements disposed in an $A^{41}$ site are mainly occupied in the A site, and the metal elements disposed in $A^{42}$ site are substituted in the other regions of the A site.

All of Chemical Formulae 2a to 2c satisfy the condition that the mole number of the metal elements disposed in the $A^{11}$ site is greater than or equal to the mole number of metal elements disposed in $A^{12}$ site on the basis of Chemical Formula 1. A number of moles of the metal elements having a larger ion radius is less than or equal to a number of moles of the metal elements having a smaller ion radius in the A site, so as to provide a first phase having the two-dimensional crystal structure including the two-dimensional perovskite material as a main phase.

The amount of the first phase in the two-dimensional perovskite material according to an embodiment may be at least greater than or equal to about 70 volume %, greater than or equal to about 80 volume %, greater than or equal to about 90 volume %, greater than or equal to about 92 volume %, greater than or equal to about 94 volume %, greater than or equal to about 96 volume %, greater than or equal to about 98 volume %, or about 100 volume %, based on 100 volume % of the two-dimensional perovskite material.

According to an embodiment, the first phase may be a Dion-Jacobson phase, but is not limited thereto, and may be a phase having two-dimensional perovskite crystal structure.

The two-dimensional perovskite material according to an embodiment may include a second phase distinguished, e.g., different, from the first phase having the two-dimensional crystal structure. The second phase may have a two-dimensional crystal structure distinguished from the first phase or may have a three-dimensional crystal structure such as a needle phase, a spherical phase, or a random phase.

The two-dimensional perovskite material according to an embodiment includes a first phase for the two-dimensional crystal structure in an amount of greater than or equal to about 80 volume %, based on 100 volume % of the two-dimensional perovskite material, so as to provide improved relative permittivity relative to a comparative dielectric material having the same thickness.

Figure 2:
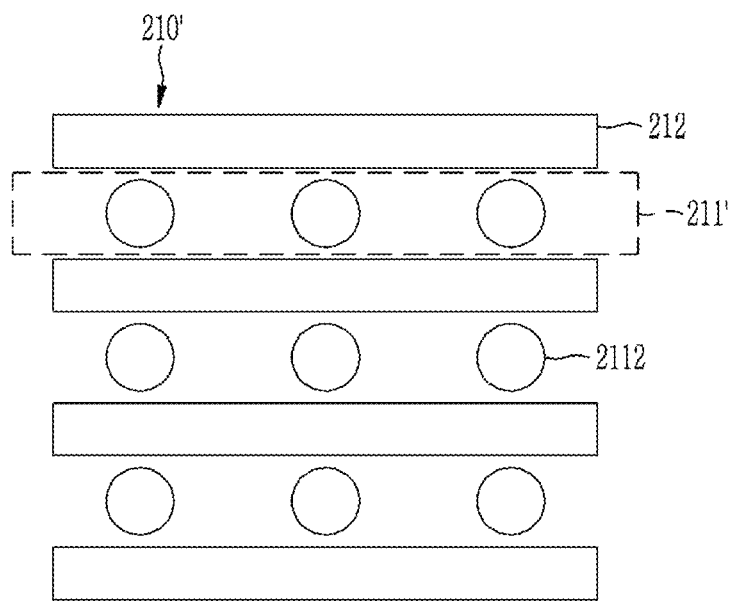
Figure 3:
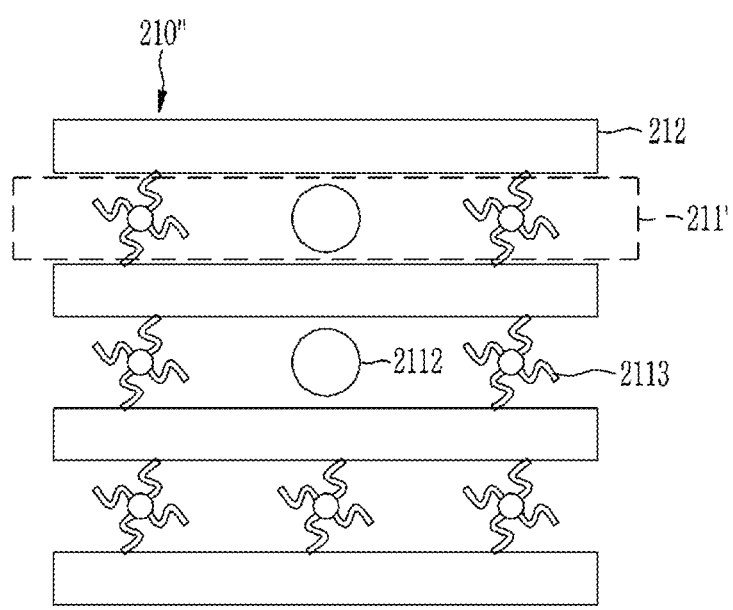

FIG. 2 schematically shows an embodiment in which alkali metal ions are substituted with protons ($H^+$) in the two-dimensional perovskite material; and FIG. 3 schematically shows an embodiment in which at least a portion of protons ($H^+$) is substituted with a cationic compound in the two-dimensional perovskite material.

The cationic compound as used herein includes polymers, and may be positively charged or capable of being positively charged under the conditions of use. The cationic compound may include a (C1 to C16 alkyl)ammonium compound, a (C1 to C16 alkyl) phosphonium compound, a (C1 to C16 alkyl)amine compound, an amine polymer, or a combination thereof. The alkylamine compound may be a primary, secondary, or tertiary amine.

Referring to FIGS. 1 to 3, the first layers 211, 211', and 211" in the two-dimensional perovskite materials 210, 210', and 210" according to an embodiment, which are a bond layer connecting, e.g., between, adjacent second layers 212, may include alkali metal ions 2111 such as Li, Na, K, Rb, Cs, and Fr as previously described or may be a layer in which the alkali metal ion is substituted with proton 2112 or a cationic compound 2113, e.g., a cationic polymer 2113.

For example, the two-dimensional perovskite material 210 may be a laminate including three or more alternating layer of a first layer 211 and a second layer 212 as shown in FIG. 1, wherein the first layer 211 may include a layered metal oxide including an assembly layer of alkali metal ions 2111.

However, when alkali metal ions 2111 of the first layer 211 are replaced by protons 2112, the first layer 211' becomes an assembly layer of protons 2112 as shown in FIG. 2. The two-dimensional perovskite material 210' according to an embodiment may include a proton-type layered metal oxide in which the layered metal oxide is acid-treated.

When at least a portion of protons 2112 present in the first layer 211' of the two-dimensional perovskite material 210' is replaced by a cationic compound, e.g., a polymer 2113, the first layer 211" becomes an assembly layer of protons 2112 and cationic compound, e.g., a polymer 2113 or an assembly layer of a cationic compound, e.g., polymer, as shown in FIG. 3. Thus, the two-dimensional perovskite material 210" according to an embodiment may include a colloidal layered metal oxide formed by the cationic compound, e.g., polymer 2113.

According to an embodiment, the cationic compound, e.g., polymer 2113 is attached onto the surface of the second layer 212 and also has a size of greater than or equal to the interlayer distance of the adjacent second layers 212. The cationic polymer may be an intercalant interposing between second layers 212 and widening a gap between second layers 212 to separate layers.

The cationic compound, e.g., polymer, 2113 is not particularly limited as long as it has a size greater than or equal to the interlayer distance between adjacent second layers 212 and functions as an intercalant, but may include, for example, a (C1 to C16 alkyl)ammonium compound, a (C1 to C16 alkyl)amine compound, or a combination thereof.

Non-limiting examples of the alkyl ammonium compound may be a tetramethyl ammonium (TMA) compound, a tetraethyl ammonium (TEA) compound, a tetrapropyl ammonium (TPA) compound, a tetrabutyl ammonium (TBA) compound, and the like and non-limiting examples of the alkylamine compound may be a methylamine (MA) compound, an ethylamine (EA) compound, a propylamine (PA) compound, a butylamine (BA) compound, and the like, but are not limited thereto.

Figure 4:
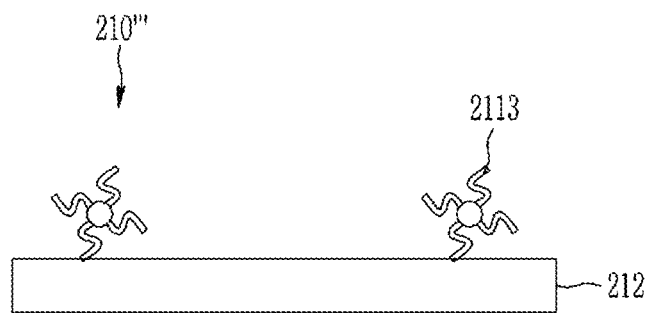
Figure 5:
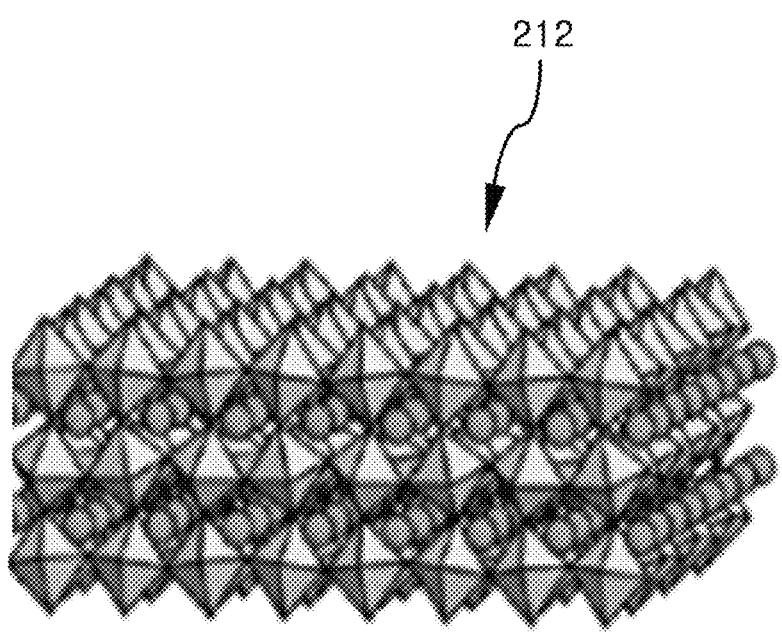

FIG. 4 schematically shows a monolayer nanosheet structure according to an embodiment in which a cationic compound, e.g., polymer is attached on a surface; FIG. 5 schematically shows a two-layered crystal structure in the two-dimensional perovskite material according to an embodiment.

The two-dimensional perovskite material 210''' according to an embodiment may be a monolayer nanosheet shown in FIG. 4.

The second layer 212 has a negative charge, but the cationic compound, e.g., polymer 2113 has a positive charge, and the monolayer nanosheet may include a cationic compound, e.g., polymer 2113 attached onto the surface in order to maintain electrical neutrality.

The monolayer nanosheet has a structure in which the cationic compound, e.g., polymer 2113 is attached onto the surface of the second layer 212 as shown in FIG. 4. The monolayer nanosheet may be obtained by substituting the assembly layer of an alkali metal ion 211 which is the first layer 211 in FIG. 1 with protons 2112 as shown in FIG. 2; substituting the same with a cationic compound, e.g. polymer 2113 as shown in FIG. 3; and exfoliating the same.

However, an embodiment is not limited thereto, but may have a structure in which two or more cationic compounds, e.g. polymers are attached to the surface of the second layer 212. In this case, a yield of monolayer nanosheet and an exfoliation efficiency compared with using only one cationic compound, e.g. polymer may be improved.

The second layer 212 in FIGS. 1 to 4 provides a two-dimensional crystal structure as shown in FIG. 5. FIG. 5 shows a layered perovskite crystal structure in a case of n=3 in Chemical Formula 1. Without wishing to be bound by any theory, it is understood that the two-dimensional perovskite material according to an embodiment forms a layered perovskite crystal structure in which assembly layers including octahedral unit lattices are laminated and include three layers.

However, the crystal structure of the two-dimensional perovskite material according to an embodiment is not limited thereto, but may include a variety of layered perovskite crystal structures satisfying n≥3.

The two-dimensional perovskite material according to an embodiment may include a nanosheet laminate including two or more laminated monolayer nanosheets.

The nanosheet laminate according to an embodiment includes both an embodiment in which the monolayer nanosheet is incompletely separated as a monolayer so as to provide two or more layers and an embodiment in which two or more preliminarily separated monolayer nanosheets are laminated.

When the monolayer nanosheets are laminated and include two or more layers, the dielectric material according to an embodiment may further include a binder for binding, e.g., between, adjacent monolayer nanosheets.

Non-limiting examples of the binder according to an embodiment may be methyl cellulose, ethyl cellulose, hydroxypropyl methyl cellulose (HPMC), hydroxypropyl cellulose (HPC), xanthan gum, polyvinyl alcohol (PVA), polyvinyl pyrrolidone (PVP), carboxy methyl cellulose, hydroxyethyl cellulose, or a combination thereof. A content of the binder may be appropriately selected, but is not particularly limited.

When the two-dimensional perovskite material according to an embodiment is exfoliated as a monolayer nanosheet, an average longitudinal diameter of the monolayer nanosheet may be greater than or equal to about 10 nm, greater than or equal to about 30 nm, greater than or equal to about 50 nm, greater than or equal to about 70 nm, greater than or equal to about 90 nm, greater than or equal to about 100 nm, greater than or equal to about 300 nm, greater than or equal to about 500 nm, greater than or equal to about 900 nm, greater than or equal to about 1 μm, greater than or equal to about 2 μm, greater than or equal to about 3 μm, greater than or equal to about 4 μm, greater than or equal to about 5 μm, or greater than or equal to about 6 μm. The longitudinal diameter as used herein refers to a longitudinal length when the crystal grain has a shape of oval or a uniaxially elongated shape similar to an oval such as a needle, a diameter length in the case of a circle/spherical shape, or a farthest distance of a line connecting any two points in the crystal grain boundary in the case of a polygonal or amorphous shape.

In addition, an average longitudinal diameter of the monolayer nanosheet may be less than or equal to about 100 μm, for example less than or equal to about 90 μm, less than or equal to about 80 μm, less than or equal to about 70 μm, less than or equal to about 60 µm, less than or equal to about 50 µm, less than or equal to about 40 µm, less than or equal to about 30 µm, less than or equal to about 20 µm, less than or equal to about 10 µm, less than or equal to about 9 µm, less than or equal to about 8 µm, or less than or equal to about 7 µm.

An average thickness of the monolayer nanosheet may be changed depending upon n of Chemical Formula 1 and may be, for example, less than or equal to about 20 nm, less than or equal to about 18 nm, less than or equal to about 16 nm, less than or equal to about 14 nm, less than or equal to about 12 nm, less than or equal to about 10 nm, less than or equal to about 9 nm, less than or equal to about 8 nm, less than or equal to about 7 nm, less than or equal to about 6 nm, less than or equal to about 5 nm, less than or equal to about 4 nm, less than or equal to about 3 nm, or less than or equal to about 2 nm.

The monolayer nanosheet may have an average thickness of greater than or equal to about 1 nm.

The two-dimensional perovskite material according to an embodiment may provide the ultra-thin film and improve dielectric characteristics relative to a comparative dielectric material, by adjusting the average longitudinal diameter and the average thickness of the monolayer nanosheet according to an embodiment within desirable ranges.

The two-dimensional perovskite material according to an embodiment may have a relative permittivity of greater than or equal to about 200, for example, greater than or equal to about 300, for example, greater than or equal to about 400, for example, greater than or equal to about 500, for example, greater than or equal to about 600, for example, greater than or equal to about 700, for example, greater than or equal to about 800, for example, greater than or equal to about 900, for example, greater than or equal to about 1,000, for example, greater than or equal to about 1,100, for example, greater than or equal to about 1,200, for example, greater than or equal to about 1,300, for example, greater than or equal to about 1,400, for example, greater than or equal to about 1,500, for example, greater than or equal to about 1,600, for example, greater than or equal to about 1,700, for example, greater than or equal to about 1,800, for example, greater than or equal to about 1,900, for example, greater than or equal to about 2,000, for example, greater than or equal to about 2,100, for example, greater than or equal to about 2,200, for example, greater than or equal to about 2,300, for example, greater than or equal to about 2,400, for example, greater than or equal to about 2,500, or greater than or equal to about 2,600 at 1 kHz. In other words, even if the two-dimensional perovskite material is formed in the form of an ultra-thin film of a monolayer nanosheet having a thickness of several to several tens of nanometers, it may exhibit improved relative permittivity as described above.

$BaTiO_3$, $PbTiO_3$, or the like which may be used as a dielectric material has a three-dimensional crystal structure. However, for example, the core of $BaTiO_3$ is formed with a three-dimensional tetragonal crystal structure having a high dielectric constant, and the surface is formed with a three-dimensional cubic crystal structure having a low dielectric constant (low-k), so the fraction of the three-dimensional cubic crystal structure of the surface may be increased when the thickness of the dielectric material is decreased. Accordingly, a dielectric constant of a comparative dielectric material tends to decrease with a decreased thickness of the dielectric material.

The two-dimensional perovskite materials 210, 210', 210", and 210''' according to an embodiment shows the two-dimensional crystal structure caused by a second layer 212, for example, a first phase in the second layer 212. The two-dimensional perovskite materials 210, 210', 210", and 210''' having the two-dimensional crystal structure may be formed in, e.g., have, a relatively thin thickness of several to several hundred nanometers, for example, several to several tens of nanometers, and also may maintain the inherent crystal structure regardless of the thickness decrease, and may be suitable for forming an ultra-thin film and improving dielectric characteristics relative to a comparative dielectric material.

Hereinafter, a dielectric material including the two-dimensional perovskite material is described.

Figure 6:
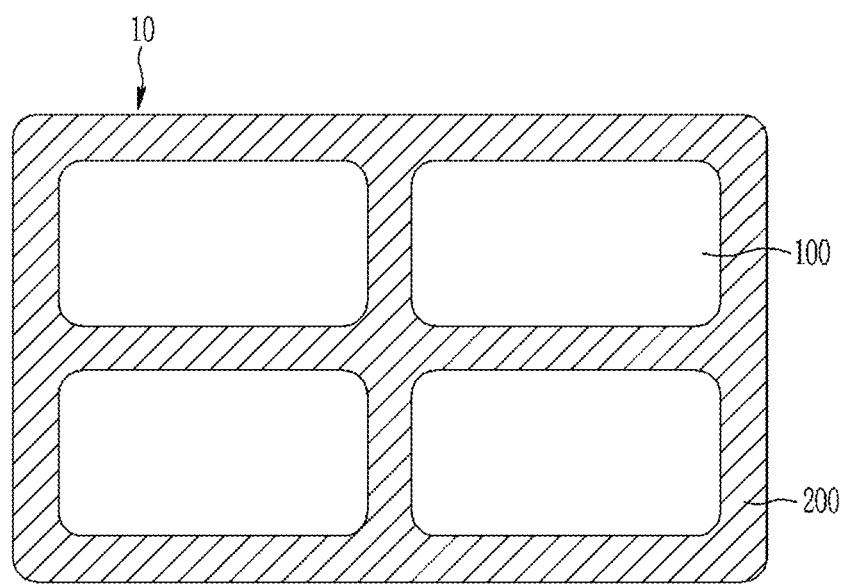

FIG. 6 schematically shows a dielectric material according to an embodiment.

The dielectric material 10 according to an embodiment may include a plurality of crystal grains 100 including a material having semi-conductivity or conductivity, e.g., a semiconductor or conductive material, and a grain boundary insulation layer 200 between the crystals grains, e.g., surrounding at least one of the crystal grains 100 or surrounding boundaries of the crystal grain 100, wherein the grain boundary insulation layer 200 covers at least a portion of the surface of the crystal grains and also includes a dielectric material including the two-dimensional perovskite material.

The dielectric material 10 according to an embodiment may be an intergranular insulation type capacitor which provides a capacitance in the grain boundary insulation layer 200 formed between the two crystal grains 100 when a predetermined voltage is applied to the adjacent two crystal grains 100, so as to function as a capacitor by itself. In addition, the plurality of crystal grains and grain boundaries are connected with each other in serial and/or in parallel, so as to carry out the overall functions of the capacitor having a predetermined capacitance.

However, an embodiment is not limited thereto, but the dielectric material 10 may be used as a dielectric material of other capacitor such as a multi-layered capacitor.

Referring to FIG. 6, crystal grains 100 may be disposed in a plurality. A plurality of crystal grains 100 may be formed of a material having semi-conductivity or conductivity, i.e., the material may be a semiconductor or conductive material. A material of the crystal grain 100 may be, for example, a metal oxide including barium titanate, strontium titanate, lead titanate, lead zirconate, lead zirconate titanate, or a combination thereof.

According to an embodiment, a donor element may be further included in the material for the crystal grains 100. The metal oxide for the crystal grain 100 may have an oxygen vacancy, and the donor element may be incorporated, e.g., solid-dissolved, in the crystal grain 100. Accordingly, the crystal grain 100 may become semi-conductive. Examples of the donor element may include La, Sm, Dy, Ho, Y, Nd, Ce, Nb, Ta, W, and the like.

According to an embodiment, the average particle diameter of the crystal grain 100 may be varied or variously determined taking into account or considering an apparent relative permittivity of the dielectric material 10, but may be adjusted within the suitable range for down-sizing and providing a film with a reduced thickness in the dielectric material 10.

An average particle diameter of the crystal grain 100 may be for example less than or equal to about 1.5 µm, less than or equal to about 1.4 µm, less than or equal to about 1.3 µm, less than or equal to about 1.2 µm, less than or equal to about 1.1 µm, less than or equal to about 1.0 µm, less than or equal to about 900 nm, less than or equal to about 800 nm, less than or equal to about 700 nm, less than or equal to about 600 nm, or less than or equal to about 500 nm and may be for example greater than or equal to about 50 nm, greater than or equal to about 60 nm, greater than or equal to about 70 nm, greater than or equal to about 80 nm, greater than or equal to about 90 nm, or greater than or equal to about 100 nm.

The grain boundary insulation layer 200 includes the dielectric material 10. An amount of the two-dimensional layered material, e.g., a ratio of the two-dimensional perovskite material to the three-dimensional bulk material, in the grain boundary insulation layer 200 is not particularly limited but may be varied or variously determined taking into account or considering a relative permittivity of other materials, for example, a three-dimensional bulk material having a three-dimensional crystal structure, a raw material, a thickness when forming the grain boundary insulation layer 200, and the like. But the amount of the two-dimensional layered material in the grain boundary insulation layer 10 may be determined to provide improved relative permittivity caused by the two-dimensional perovskite material even when the grain boundary insulation layer 200 is formed in, e.g., with, a size, e.g., thickness, of a several to several tens of nanometers.

An amount of the two-dimensional perovskite material in the grain boundary insulation layer 200 may be for example greater than or equal to about 10 volume %, greater than or equal to about 15 volume %, greater than or equal to about 20 volume %, greater than or equal to about 25 volume %, greater than or equal to about 30 volume %, greater than or equal to about 35 volume %, for example, greater than or equal to about 40 volume %, greater than or equal to about 45 volume %, greater than or equal to about 50 volume %, greater than or equal to about 55 volume %, greater than or equal to about 60 volume %, greater than or equal to about 65 volume %, greater than or equal to about 70 volume %, greater than or equal to about 75 volume %, greater than or equal to about 80 volume %, greater than or equal to about 85 volume %, greater than or equal to about 90 volume %, greater than or equal to about 95 volume %, or greater than or equal to about 100 volume % based on 100 volume % of the grain boundary insulation layer 200.

The two-dimensional perovskite material may be directly contacted to the surface of the crystal grain 100, or may be disposed so that at least a portion thereof may leave a space in a predetermined gap from the surface of the crystal grain 100, e.g., an interval of a predetermined distance may be present between the two-dimensional layered material and the surface of the crystal grains 20.

In addition, the two-dimensional perovskite material may be formed only in a partial region of the surface of the crystal grain 100 to cover a portion of the surface of crystal grain 100, or may be formed to cover the entire surface of at least one of the crystal grains 100.

The dielectric material 10 shows a two-dimensional crystal structure of a two-dimensional perovskite material in the grain boundary insulation layer 200, for example, a two-dimensional crystal structure caused by the first phase in the second layer of the two-dimensional crystal structure.

The relative permittivity of the dielectric material 10 according to an embodiment may be varied variously determined taking into account or depending upon an average particle diameter of the crystal grain and a thickness of the grain boundary insulation layer, but the dielectric material 10 may have a relative permittivity allowable for a capacitor even if the dielectric material is formed in an ultra-small size, e.g., including an ultra-thin film.

The dielectric material 10 may have a relative permittivity of, for example, greater than or equal to about 1,000, greater than or equal to about 2,000, greater than or equal to about 3,000, greater than or equal to about 4,000, greater than or equal to about 5,000, greater than or equal to about 6,000, greater than or equal to about 7,000, greater than or equal to about 8,000, greater than or equal to about 9,000, or greater than or equal to about 10,000.

The dielectric material may satisfy the following Equation 1 relating to the apparent relative permittivity.

$$\varepsilon_{rAPP} \propto \varepsilon_r \cdot d/t \qquad \text{Equation 1}$$

In Equation 1, ErApp refers to an apparent relative permittivity of dielectric material, $\varepsilon_r$ refers to a relative permittivity of grain boundary insulation layer, d refers to an average particle diameter of crystal grain, t refers to a thickness of grain boundary insulation layer.

The intergranular insulation layer, which may be included in comparative dielectric materials, includes only three-dimensional bulk material having a three-dimensional crystal structure such as $BaTiO_3$, $PbTiO_3$, and the apparent relative permittivity of the dielectric material also tends to be decreased when a thickness t of the grain boundary insulation layer is decreased. Accordingly, in a comparative dielectric material it may be difficult to form a grain boundary insulation layer in an ultra-thin film having a thickness below a predetermined level.

As the dielectric material according to an embodiment has a two-dimensional crystal structure including at least a two-dimensional perovskite material, the dielectric material may exhibit a relative permittivity greater than or equal to a predetermined level, e.g., caused by the two-dimensional perovskite material, even if the grain boundary insulation layer is formed as an ultra-thin film having a thickness t of several to several tens of nanometers. When using the two-dimensional perovskite material, a thickness and a relative permittivity of the grain boundary insulation layer may be independently controlled, unlike a comparative dielectric material.

Thus the dielectric material according to an embodiment includes the two-dimensional perovskite material in the grain boundary insulation layer, and a relative permittivity greater than or equal to a predetermined level caused by the two-dimensional perovskite material even if the dielectric material is formed in a form of an ultra-thin film having a thickness of several to several tens of nanometers may be exhibited, and also the device may be formed in a small-size and with a thin-film.

Hereinafter, a multi-layered capacitor including the two-dimensional perovskite material is described.

Figure 7:
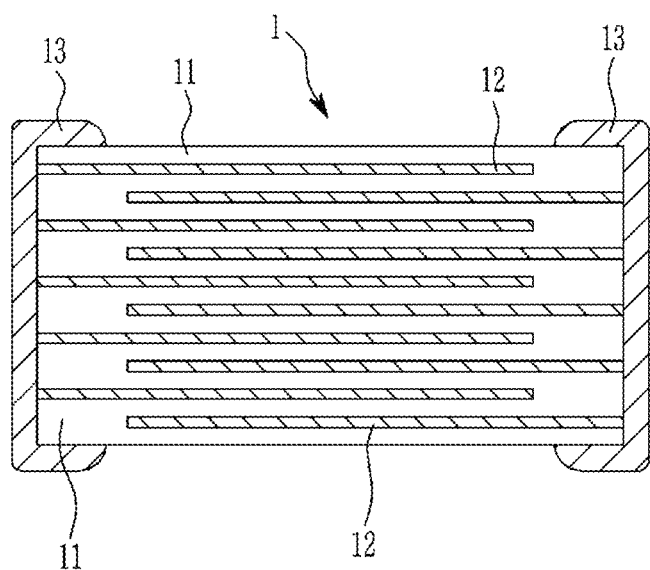

FIG. 7 schematically shows a multi-layered capacitor according to an embodiment.

The multi-layered capacitor 1 according to an embodiment may have a laminated structure including alternating layers of an internal electrode 12 and a dielectric layer 11, wherein the dielectric layer 11 includes a dielectric material 10 as shown in FIG. 6.

The multi-layered capacitor 1 according to an embodiment may include two or more including an internal electrode 12 and a dielectric layer 11 that are alternated and laminated as shown in FIG. 7. Accordingly, the adjacent internal electrodes and a dielectric layer disposed therebetween may work one unit capacitor.

In addition, in a case of the multi-layered capacitor 1 according to an embodiment, two or more layers including the internal electrode 12 and the dielectric layer 11 are alternated and laminated, for example, three or more layers are alternated and laminated, four or more layers are alternated and laminated, or greater than or equal to about five or more layers are alternated and laminated, so the multi-layered capacitor 1 may exhibit a capacitance caused by a parallel-disposed structure of the interposed unit capacitors.

The internal electrode 12 may be formed to have a smaller area than the area of the dielectric layer 11. Each of the internal electrodes 12 may have the same area and may be laminated while arranging in a zigzag pattern such that the internal electrodes 12 are incompletely covered by one another between adjacent internal electrodes, as shown in FIG. 7.

The dielectric layer 11 may be formed to have a larger area than the area of the internal electrode 12, and the adjacent dielectric layers may be connected with each other to provide the cross-sectional surface with an overall serpentine shape, as shown in FIG. 7.

According to an embodiment, the multi-layered capacitor 1 may further include a pair of external electrodes 13 surrounding both lateral sides of the laminate including the dielectric layer 11 and the internal electrode 12. However, an embodiment is not limited thereto, and the external electrode may be omitted, and the internal electrode may extend longitudinally on or in both lateral sides of the laminate structure including the dielectric layer and the internal electrode; or a power source is connected to the internal electrode without the external electrode.

The multi-layered capacitor may include a plurality of dielectric layers and internal electrodes, and the total thickness of the dielectric layer is an important factor determining the small-size and thin-film, e.g., relatively thin film thickness, of the multi-layered capacitor. But the dielectric layer of a comparative multi-layered capacitor includes $BaTiO_3$, $PbTiO_3$, or the like as a dielectric material, and the relative permittivity is also decreased with a decreasing thickness, as previously described.

Thus when the dielectric layer of a comparative multi-layered capacitor is formed as a thin film, a thickness of one layer of the dielectric layer is limited to about 550 nm to about 600 nm, and a comparative dielectric layer may exhibit a relative permittivity of about 3,000 to about 3,500. In addition, when a comparative dielectric layer is formed as an ultra-thin film having a thickness below the limit range, the relative permittivity relative to the thickness decrease is sharply decreased, so that it exhibits properties in an insufficient level for using a dielectric layer for a multi-layered capacitor.

However, as the dielectric layer 11 of the multi-layered capacitor 1 according to an embodiment includes the dielectric material 10, it may be formed as an ultra-thin film so that a thickness of one layer of the dielectric layer 11 is less than about 500 nm, for example, less than or equal to about 490 nm, less than or equal to about 480 nm, less than or equal to about 470 nm, less than or equal to about 460 nm, less than or equal to about 450 nm, less than or equal to about 440 nm, less than or equal to about 430 nm, less than or equal to about 420 nm, less than or equal to about 410 nm, or less than or equal to about 400 nm.

Therefore, the multi-layered capacitor 1 according to an embodiment may exhibit a relative permittivity, e.g., caused by the two-dimensional perovskite material in the dielectric layer 11. When a thickness per one layer of the dielectric layer 11 satisfies the previously described range, one layer of the dielectric layer 11 may have a relative permittivity of, for example, greater than or equal to about 4,000, greater than or equal to about 4,200, greater than or equal to about 4,400, greater than or equal to about 4,600, for example, greater than or equal to about 4,800, greater than or equal to about 4,900, or greater than or equal to about 5,000 and a relative permittivity of, for example, about 5,000 to about 7,000, about 5,000 to about 6,500, about 5,000 to about 6,000, or about 5,000 to about 5,500.

In addition, the multi-layered capacitor 1 according to an embodiment may exhibit a relative permittivity of, for example, greater than or equal to about 4,000, greater than or equal to about 5,000, greater than or equal to about 6,000, greater than or equal to about 7,000, greater than or equal to about 8,000, greater than or equal to about 9,000, greater than or equal to about 10,000, greater than or equal to about 12,000, greater than or equal to about 14,000, greater than or equal to about 16,000, greater than or equal to about 18,000, or greater than or equal to about 20,000.

In the multi-layered capacitor 1 according to an embodiment, a thickness in each of the dielectric layers may be decreased by about 100 nm per layer relative to a comparative capacitor, and a number of laminated dielectric layers 11 in the multi-layered capacitor 1 may be improved relative to comparative conditions and thus an improved capacitance may be realized.

In addition, an embodiment may provide a multi-layered capacitor 1 with improved capacitance and relative permittivity, which may be formed with an ultra-thin film and in a smaller size relative to a comparative capacitor.

Hereinafter, a method of manufacturing the two-dimensional perovskite material is described.

Figure 8:
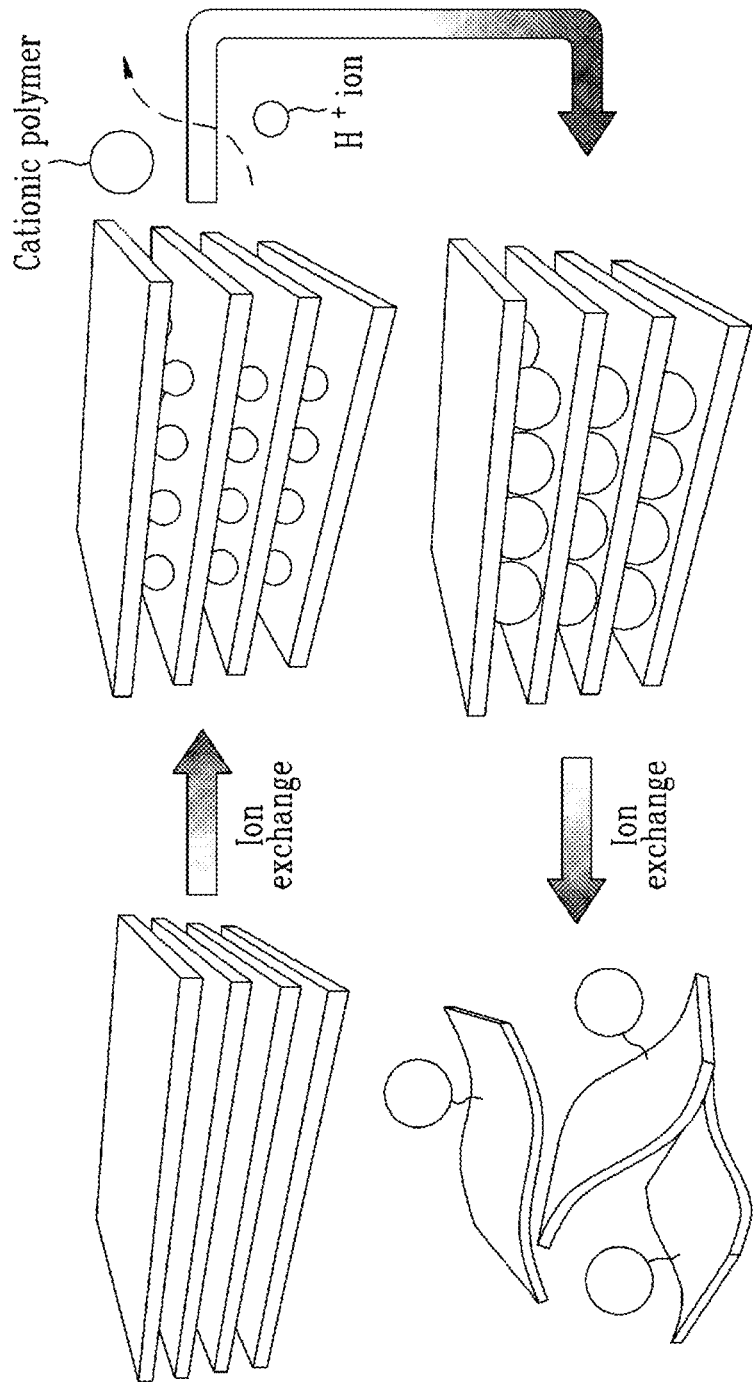

FIG. 8 sequentially shows a process of exfoliating a monolayer nanosheet from the layered metal oxide in the method of manufacturing the two-dimensional perovskite material according to an embodiment.

The method of manufacturing a two-dimensional perovskite material according to an embodiment may include: preparing a layered metal oxide including an alternate laminate including alternating layers including a first layer having a positive charge and a second layer having a negative charge; acid-treating the layered metal oxide to exchange the first layer with protons; colloidizing the acid-treated layered metal oxide to substitute the protons with a cationic compound, e.g. polymer; exfoliating a monolayer nanosheet including the second layer from the colloidal layered metal oxide.

Figure 9:
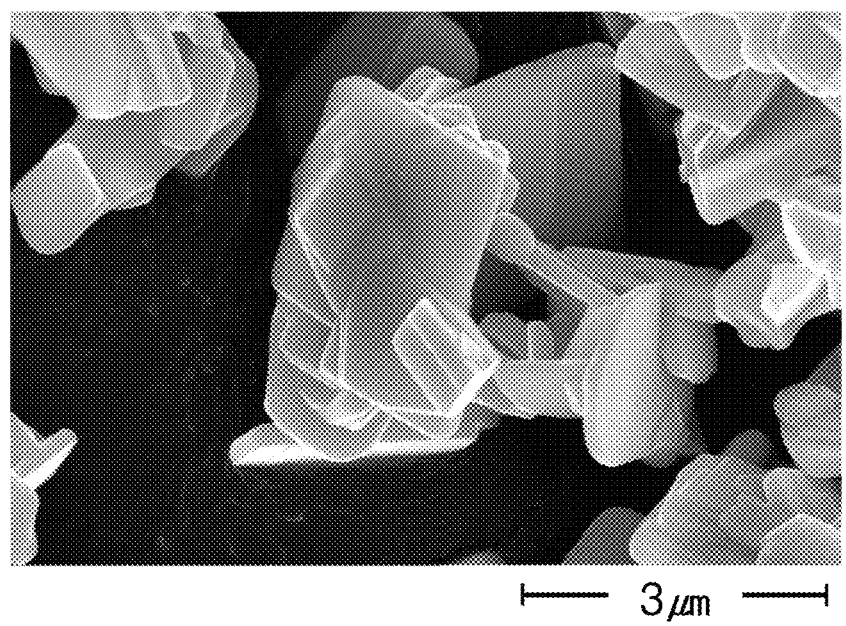
FIG. 9 is a microscopic image of a layered metal oxide K[Sr$_{1.6}$Ba$_{0.4}$Nb$_3$O$_{10}$]
Figure 10:
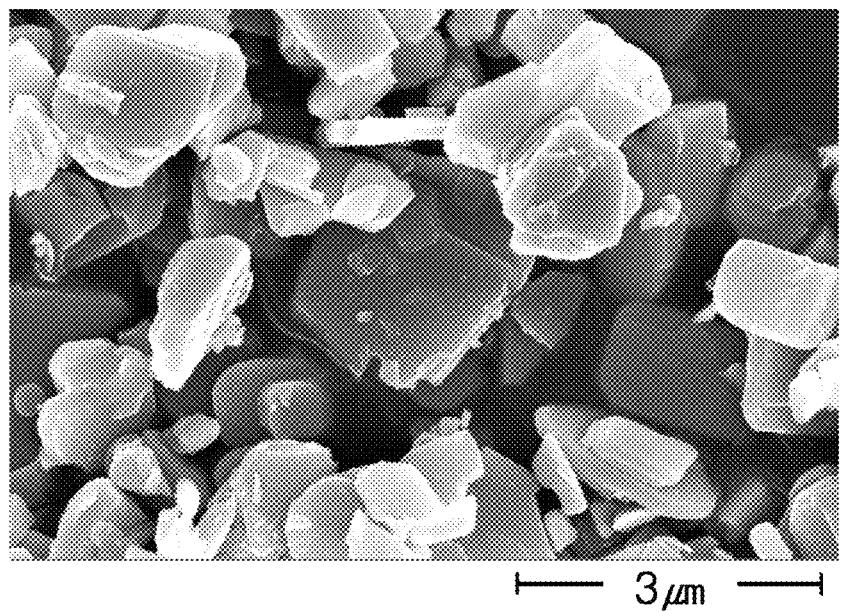
FIG. 10 is a microscopic image of an ion exchanged layered metal oxide H[Sr$_{1.6}$Ba$_{0.4}$Nb$_3$O$_{10}$]
Figure 11:
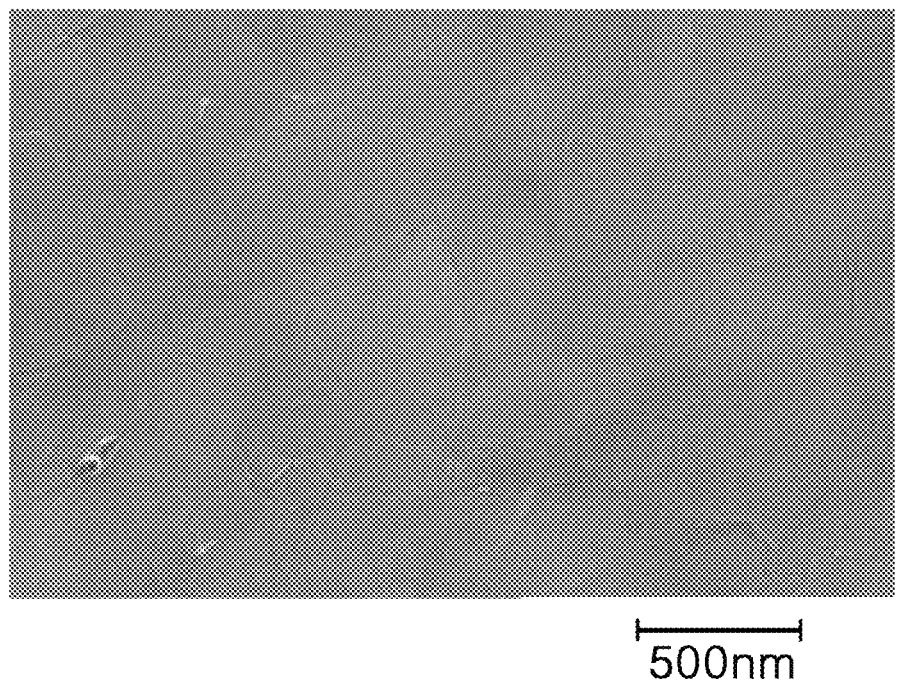
FIG. 11 is a microscopic image showing a large quantity of exfoliated monolayer nanosheets.

Hereinafter, the process of exfoliating the layered metal oxide of $K[Sr_{1.6}Ba_{0.4}Nb_3O_{10}]$ into a monolayer nanosheet of $TBA-[Sr_{1.6}Ba_{0.4}Nb_3O_{10}]$ is described further referring to FIGS. 9 to 11 in addition to FIG. 8. However, FIGS. 9 to 11 show an example of the method of manufacturing a dielectric material according to an embodiment, but an embodiment is not limited to the layered metal oxide or the used cationic compound, e.g. polymer. FIG. 9 is a microscopic image of a layered metal oxide $K[Sr_{1.6}Ba_{0.4}Nb_3O_{10}]$.

First, as shown in FIG. 9, a layered metal oxide $K[Sr_{1.6}Ba_{0.4}Nb_3O_{10}]$ in which several layers including a first layer (assembly layer of $K^+$) and a second layer $[Sr_{1.6}Ba_{0.4}Nb_3O_{10}]$ are alternated and laminated is prepared.

FIG. 10 is a microscopic image of an ion-exchanged layered metal oxide $H[Sr_{1.6}Ba_{0.4}Nb_3O_{10}]$.

Then the prepared layered metal oxide is reacted with an acidic solution such as HCl, $HNO_3$ and the like to make the cationic first layer to be protonized. $K^+$ ion of the first layer is ion-exchanged with proton to make the first layer into an assembly layer including protons. Thus the layered metal oxide becomes proton-type layered metal oxide represented by $H[Sr_{1.6}Ba_{0.4}Nb_3O_{10}]$.

Then the obtained proton-type layered metal oxide is reacted with a cationic compound, e.g. polymer to provide a colloid. Examples of the cationic compound, e.g. polymer may be a tetramethyl ammonium compound, a tetraethyl ammonium compound, a tetrapropyl ammonium compound, a tetrabutyl ammonium compound, a methylamine compound, an ethylamine compound, a propylamine compound, a butylamine compound, or combination thereof. Thereby, at least a portion of protons of the first layer may be substituted with a cationic compound, e.g. polymer.

As the cationic compound, and in particular a polymer, has a large molecule size, it may be interposed between adjacent second layers to widen a gap between the second layers, inducing separation of layers.

According to an embodiment, the acid-treated layered metal oxide may be colloidized by two or more cationic compounds, including polymers, e.g., two or more cationic compounds or polymers having different sizes from each other may be used as the cationic polymer.

For example, the two or more cationic compounds, e.g., polymers having different sizes from each other may be two or more compounds having different sizes by having different carbon numbers of alkyl groups or different functional groups from each other.

When two or more cationic compounds, e.g. polymers are used as above, the two or more cationic compounds, e.g., polymers may be present on the surface of the prepared monolayer nanosheet.

Without being bound by any particular theory, it may be difficult to uniformly exfoliate monolayer when using only one kind of intercalant having a predetermined size during the intercalation exfoliation process. For example, when the an intercalant is used as a single intercalant such as tetrabutyl ammonium hydroxide (TBAOH) or tetramethyl ammonium hydroxide (TMAOH), or ethylamine (EA), the protonized layered metal oxide is difficult to exfoliate into monolayers but may be exfoliated into a sheet having 2 or more layers with a random thickness, and the obtained nanosheets may have an average thickness of about 3 to 4 nm.

For example, when using a single intercalant having a large molecule size such as TBAOH, it is difficult to provide exfoliated nanosheets having a uniform and thin thickness. On the other hand, when using an intercalant having a small molecule size such as TMAOH or EA, it is difficult to provide exfoliated nanosheets.

Accordingly, by using intercalant having a large molecule size such as TBAOH together with intercalant having a small molecule size such as TMAOH or EA, a yield of monolayer nanosheets and the exfoliation efficiency may be improved.

However, an embodiment is not necessarily limited thereto, but it may be exfoliated by using only the single cationic compound, e.g., polymer as the intercalant.

FIG. 11 is a microscopic image showing many exfoliated monolayer nanosheets.

Then, the layered metal oxide colloidized by cationic compounds, e.g. polymers is added into a solvent and stirred to exfoliate a monolayer nanosheet from the colloidal layered metal oxide.

The stirring may include ultrasonication. For example, the cationic compound, e.g., polymer is inserted by stirring for a predetermined time and performed with ultrasonication. The ultrasonic power may be greater than or equal to about 20 W, for example, greater than or equal to about 40 W, or greater than or equal to about 60 W. The ultrasonic power may be less than or equal to about 400 W, for example, less than or equal to about 300 W, less than or equal to about 200 W, or less than or equal to about 100 W. The means for ultrasonication may include any suitable disclosed devices or commercially available devices.

The stirring time is not particularly limited and may be appropriately selected. For example, the stirring time may be greater than or equal to about 10 minutes, greater than or equal to about 30 minutes, or greater than or equal to 1 hour. The stirring time may be greater than or equal to about 1 day, greater than or equal to about 2 days, or even greater than or equal to about 3 days. The ultrasonication stirring may shorten the stirring time. The ultrasonication time may be greater than or equal to about 1 minute, for example, greater than or equal to about 5 minutes. The ultrasonication time may be less than or equal to about 300 minutes, for example, less than or equal to about 100 minutes, less than or equal to about 90 minutes, less than or equal to about 80 minutes, less than or equal to about 70 minutes, or less than or equal to about 60 minutes.

The monolayer nanosheets obtained by the ultrasonication may exhibit a relatively small deviation in a side-directional size. Thus, according an embodiment, the monolayer nanosheets may exhibit a standard deviation of less than or equal to about 1.5 µm, for example, less than or equal to about 1 µm, less than or equal to about 0.9 µm, less than or equal to about 0.8 µm, less than or equal to about 0.7 µm, less than or equal to about 0.6 µm, or less than or equal to about 0.5 µm in a side-direction size.

When the monolayer nanosheets are exfoliated by ultrasonication, it is easy to control a concentration of the obtained colloid solution compared with simple stirring. According to an embodiment, the concentration of the monolayer nanosheets in the colloid solution may be about 1 g/L to about 1.7 g/L, for example, about 1.3 g/L to about 1.6 g/L.

Many monolayer nanosheets may be present in the exfoliated colloidal layered metal oxide, as shown in FIG. 11. The monolayer nanosheet includes a second layer and a cationic compound, wherein the cationic compound is attached on the surface of the second layer. The monolayer nanosheet may be represented by "cationic compound-$[A^{11}_{(n-m-1)}A^{12}_{m}B'_{n}O_{(3n+1)}]$". For example, TBAOH is used as an intercalant in FIG. 11, so the monolayer nanosheet is represented by TBA-$[Sr_{1.6}Ba_{0.4}Nb_3O_{10}]$.

Then the exfoliated monolayer nanosheet is post-processed to provide a powder or processed to provide a shape of pellet or the like, or processed in a shape of a coating agent or the like. For example, a C1 to C15 alcohol, a binder, and selectively a dispersing agent (e.g., a C2 to C20 organic acid) are mixed in a colloidal aqueous solution including the obtained monolayer nanosheet.

According to the method of manufacturing the two-dimensional perovskite material of an embodiment, the layered metal oxide may be exfoliated in a single nanosheet by the simple process, so the two-dimensional perovskite material including the exfoliated single nanosheet may exhibit a large relative permittivity even in the region having a thickness ranging from several to several tens of nanometers.

Hereinafter, the embodiments are illustrated in more detail with reference to examples. These examples, however, are not in any sense to be interpreted as limiting the scope of the present disclosure.

EXAMPLES

Measurement method:
Relative Permittivity, and tan δ

Examples and Comparative Examples are measured for a relative permittivity using a dielectric analysis.

The subject powder is shaped into a pellet, and both surfaces of the pellet are coated with Ag paste. Then 1V voltage having a wavelength of about 1 kHz is applied to one surface coated with Ag paste, and the other surface coated with Ag paste is measured for a wavelength delivered thereto.

The delivered signal decreases amplitude by an ion transport and a polarity arrangement to shift a phase site. When a material has polarity, the electric field is rearranged, and the charged ions may be transferred to an electrode having opposite polarity. The dielectric characteristics such as a capacitance, a dielectric constant, a dielectric loss (tan δ) may be calculated from the amplitude and the phase shift.

Then the obtained each dielectric constant data according to Examples and Comparative Examples is divided by a dielectric constant in vacuum $\varepsilon_0$ to obtain a relative permittivity of each Examples and Comparative Examples.

Resistivity

Using a DC resistance measurer, the pellet which is coated with Ag paste on the both surfaces is applied with a voltage of 200 V, and the flowing current is measured.

Then each resistivity of Examples and Comparative Examples may be calculated from a volume of the pellet and the flowing current relative to the applied voltage.

Preparation Example

Preparation of (TBA)-$[A^{11}_{(n-m-1)}A^{12}_m B'_n O_{(3n+1)}]$ Nanosheet $K_2CO_3$, an oxide of the metal element to be disposed in $A^{11}$ site, an oxide of the metal element to be disposed in $A^{12}$, and a B metal oxide are mixed at 0.55:n-m-1:m:n (mole ratio), and the mixture is shaped into a pellet. 10 g of the obtained pellet is input into an alumina crucible and heat-treated in a tube furnace at 600° C. to 1400° C. for 12 hours under the air atmosphere. Subsequently, the furnace is cooled at a room temperature, and the treated pellet is taken out therefrom and pulverized to provide a fine powder.

The obtained fine powder is cleaned with about 500 mL to 2 L of water for 6 hours and filtered to provide powder. The composite of the obtained powder is $K[A^{11}_{(n-m-1)}A^{12}_m B'_n O_{(3n+1)}]$, which has a layered structure as shown in FIG. 9.)

The obtained $K[A^{11}_{(n-m-1)}A^{12}_m B'_n O_{(3n+1)}]$, powder is added into 5 M of $HNO_3$ solution and then stirred for 3 days and then filtered to provide only powder. The composition of the obtained powder is $H[A^{11}_{(n-m-1)}A^{12}_m B'_n O_{(3n+1)}]$, which has a layered structure as shown in FIG. 10.

An intercalant of 0.003 mol of TBAOH and 500 ml of an aqueous solution are added into 2 g of the obtained $H[A^{11}_{(n-m-1)}A^{12}_m B'_n O_{(3n+1)}]$ powder and stirred for 14 days.

After completing all processes, the final solution is centrifuged under the conditions of 2,000 rpm, 30 minutes, and the floating intercalant is removed using a dialysis tube to provide an aqueous colloid solution including the exfoliated (TBA)-$[A^{11}_{(n-m-1)}A^{12}_m B'_n O_{(3n+1)}]$ nanosheets. Many (TBA)-$[A^{11}_{(n-m-1)}A^{12}_m B'_n O_{(3n+1)}]$ nanosheets are found in the aqueous colloid solution as shown in FIG. 11.

Example 1

$K[Sr_{1.6}Ba_{0.4}Nb_3O_{10}]$ Layered Metal Oxide $K[Sr_{1.6}Ba_{0.4}Nb_3O_{10}]$ powder is obtained instead of $K[A^{11}_{(n-m-1)}A^{12}_m B'_n O_{(3n+1)}]$ in accordance with the same procedure as in the Preparation Example, except that $K_2CO_3$, $SrCO_3$, $BaCO_3$, $Nb_2O_5$ are mixed at 0.55:1.6:0.4:1.5 (mole ratio).

Figure 12:
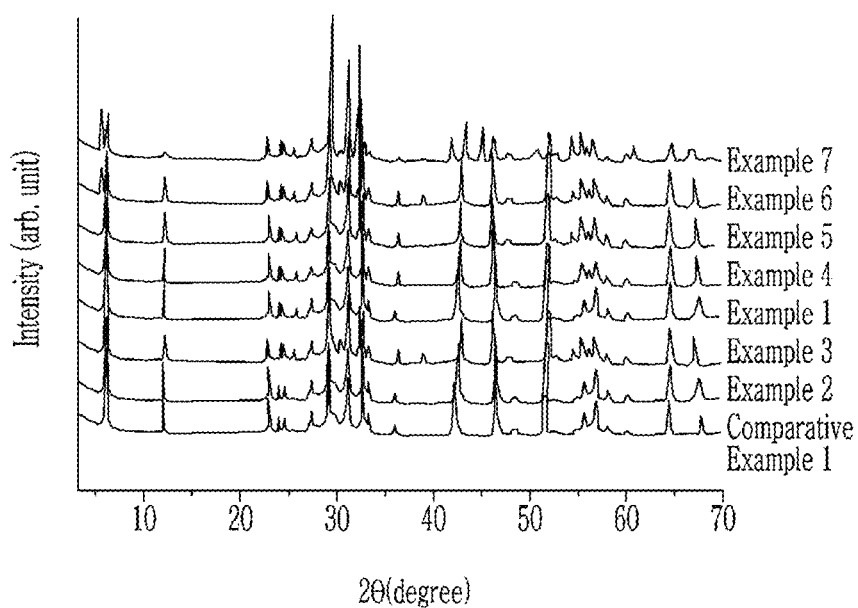
FIG. 12 shows X-ray diffraction (XRD) graphs according to Examples 1 to 7 and Comparative Example 1.
Figure 13:
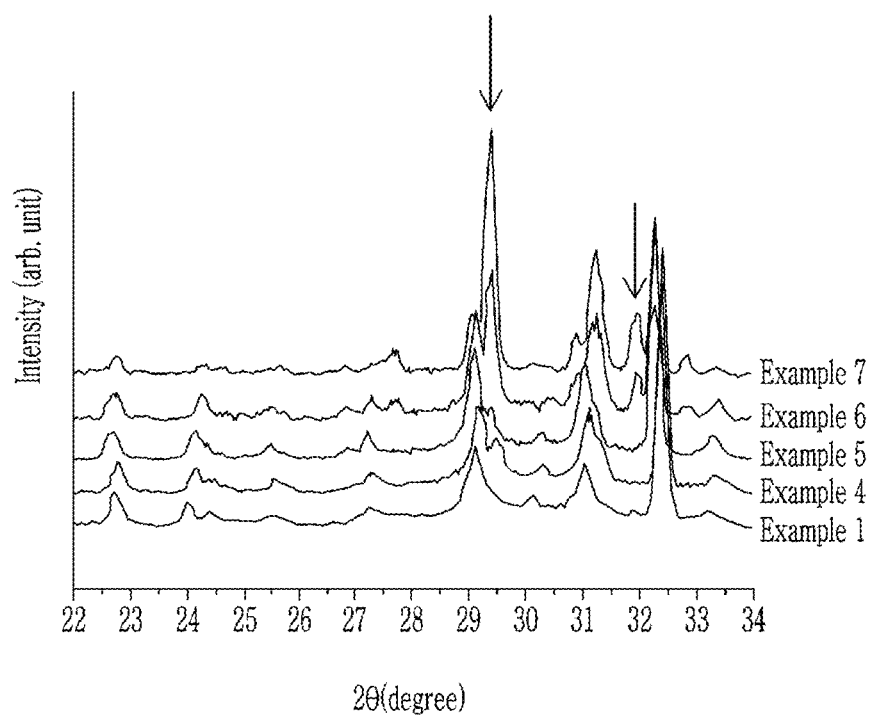
FIG. 13 is a graph showing enlarged regions in which 2θ ranges from 22° to 34° of Examples 1, and 4 to 7 in the X-ray diffraction graph of FIG. 12.

A portion of the obtained $K[Sr_{1.6}Ba_{0.4}Nb_3O_{10}]$ powder is measured for an XRD data using an X-ray diffractometer (XRD), and the results are shown in FIG. 12 and FIG. 13.

The obtained $K[Sr_{1.6}Ba_{0.4}Nb_3O_{10}]$ powder is shaped into a pellet and then heat-treated to provide a pellet including a $K[Sr_{1.6}Ba_{0.4}Nb_3O_{10}]$ layered metal oxide according to Example 1.

Example 2

$K[Sr_{1.8}Ba_{0.2}Nb_3O_{10}]$ Layered Metal Oxide

A pellet including a $K[Sr_{1.8}Ba_{0.2}Nb_3O_{10}]$ layered metal oxide according to Example 2 is obtained in accordance with the same procedure as in Example 1, except that $K_2CO_3$, $SrCO_3$, $BaCO_3$, $Nb_2O_5$ are mixed at 0.55:1.8:0.2:1.5 (mole ratio).

A portion of the $K[Sr_{1.8}Ba_{0.2}Nb_3O_{10}]$ powder obtained from the procedure is measured for an XRD data using an X-ray diffractometer (XRD), and the results are shown in FIG. 12.

Example 3

$K[Sr_{1.7}Ba_{0.3}Nb_3O_{10}]$ Layered Metal Oxide

A pellet including a $K[Sr_{1.7}Ba_{0.3}Nb_3O_{10}]$ layered metal oxide according to Example 3 is obtained in accordance with the same procedure as in Example 1, except that $K_2CO_3$, $SrCO_3$, $BaCO_3$, $Nb_2O_5$ are mixed at 0.55:1.7:0.3:1.5 (mole ratio).

A portion of the $K[Sr_{1.7}Ba_{0.3}Nb_3O_{10}]$ powder obtained from the procedure is measured for an XRD data using an X-ray diffractometer (XRD), and the results are shown in FIG. 12.

Example 4

$K[Sr_{1.5}Ba_{0.5}Nb_3O_{10}]$ Layered Metal Oxide

A pellet including a $K[Sr_{1.5}Ba_{0.5}Nb_3O_{10}]$ layered metal oxide according to Example 4 is obtained in accordance with the same procedure as in Example 1, except that $K_2CO_3$, $SrCO_3$, $BaCO_3$, $Nb_2O_5$ are mixed at 0.55:1.5:0.5:1.5 (mole ratio).

A portion of the $K[Sr_{1.5}Ba_{0.5}Nb_3O_{10}]$ powder obtained from the procedure is measured for an XRD data using an X-ray diffractometer (XRD), and the results are shown in FIG. 12 and FIG. 13.

Example 5

$K[Sr_{1.4}Ba_{0.6}Nb_3O_{10}]$ Layered Metal Oxide

A pellet including a $K[Sr_{1.4}Ba_{0.6}Nb_3O_{10}]$ layered metal oxide according to Example 5 is obtained in accordance with the same procedure as in Example 1, except that $K_2CO_3$, $SrCO_3$, $BaCO_3$, $Nb_2O_5$ are mixed at 0.55:1.4:0.6:1.5 (mole ratio).

A portion of the $K[Sr_{1.4}Ba_{0.6}Nb_3O_{10}]$ powder obtained from the procedure is measured for an XRD data using an X-ray diffractometer (XRD), and the results are shown in FIG. 12 and FIG. 13.

Example 6

$K[Sr_{1.2}Ba_{0.8}Nb_3O_{10}]$ Layered Metal Oxide

A pellet including a $K[Sr_{1.2}Ba_{0.8}Nb_3O_{10}]$ layered metal oxide according to Example 6 is obtained in accordance with the same procedure as in Example 1, except that $K_2CO_3$, $SrCO_3$, $BaCO_3$, $Nb_2O_5$ are mixed at 0.55:1.2:0.8:1.5 (mole ratio).

A portion of the $K[Sr_{1.2}Ba_{0.8}Nb_3O_{10}]$ powder obtained from the procedure is measured for an XRD data using an X-ray diffractometer (XRD), and the results are shown in FIG. 12 and FIG. 13.

Example 7

$K[SrBaNb_3O_{10}]$ Layered Metal Oxide

A pellet including a $K[SrBaNb_3O_{10}]$ layered metal oxide according to Example 7 is obtained in accordance with the same procedure as in Example 1, except that $K_2CO_3$, $SrCO_3$, $BaCO_3$, $Nb_2O_5$ are mixed at 0.55:1:1:1.5 (mole ratio).

Figure 14:
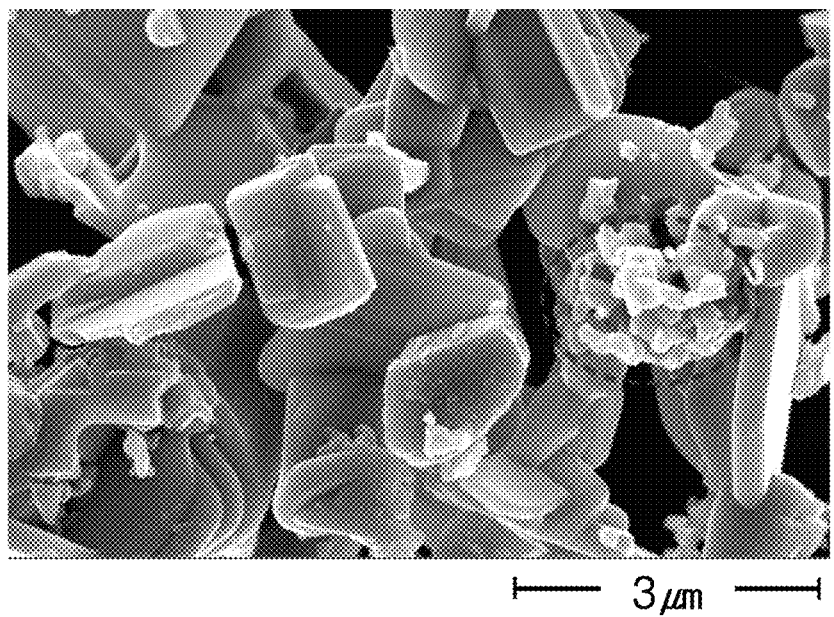
FIG. 14 is a microscopic image of a layered metal oxide K[SrBaNb$_3$O$_{10}$] according to Example 7.

A portion of the $K[SrBaNb_3O_{10}]$ powder obtained from the procedure is measured for an XRD data using an X-ray diffractometer (XRD), and the results are shown in FIG. 12 and FIG. 13, and a portion of the $K[SrBaNb_3O_{10}]$ powder is observed by a scanning electron microscopy (SEM), and the results are shown in FIG. 14.

Example 8

$H[Sr_{1.6}Ba_{0.4}Nb_3O_{10}]$ Proton Type Layered Metal Oxide

The $K[Sr_{1.6}Ba_{0.4}Nb_3O_{10}]$ powder obtained from Example 1 is added into 5 M of a $HNO_3$ solution and stirred for 3 days and then filtered to provide $H[Sr_{1.6}Ba_{0.4}Nb_3O_{10}]$ powder.

The obtained $H[Sr_{1.6}Ba_{0.4}Nb_3O_{10}]$ powder is shaped into a pellet and heat-treated to provide a pellet including $H[Sr_{1.6}Ba_{0.4}Nb_3O_{10}]$ proton-type metal oxide according to Example 8.

Example 9

$H[Sr_{1.8}Ba_{0.2}Nb_3O_{10}]$ Proton Type Layered Metal Oxide $K[Sr_{1.8}Ba_{0.2}Nb_3O_{10}]$ powder obtained from Example 2 is added into 5 M of a $HNO_3$ solution and stirred for 3 days and then filtered to provide $H[Sr_{1.8}Ba_{0.2}Nb_3O_{10}]$ powder.

The obtained $H[Sr_{1.8}Ba_{0.2}Nb_3O_{10}]$ powder is shaped into a pellet and heat-treated to provide a pellet including $H[Sr_{1.8}Ba_{0.2}Nb_3O_{10}]$ proton-type metal oxide according to Example 9.

Example 10

$H[Sr_{1.4}Ba_{0.6}Nb_3O_{10}]$ Proton Type Layered Metal Oxide $K[Sr_{1.4}Ba_{0.6}Nb_3O_{10}]$ powder obtained from Example 5 is added into 5 M of a $HNO_3$ solution and stirred for 3 days and then filtered to provide $H[Sr_{1.4}Ba_{0.6}Nb_3O_{10}]$ powder.

The obtained $H[Sr_{1.4}Ba_{0.6}Nb_3O_{10}]$ powder is shaped into a pellet and heat-treated to provide a pellet including $H[Sr_{1.4}Ba_{0.6}Nb_3O_{10}]$ proton-type metal oxide according to Example 10.

Comparative Example 1

$K[Sr_2Nb_3O_{10}]$ Layered Metal Oxide $K[Sr_2Nb_3O_{10}]$ powder is obtained instead of $K[A^{11}_{(n-m-1)}A^{12}_{m}B'_{n}O_{(3n+1)}]$ in accordance with the same procedure as in Preparation Example, except that $K_2CO_3$, $SrCO_3$, $Nb_2O_5$ are mixed at 0.55:2:1.5 (mole ratio).

A portion of the obtained $K[Sr_2Nb_3O_{10}]$ powder is measured for an XRD data using an X-ray diffractometer (XRD), and the results are shown in FIG. 12.

The obtained $K[Sr_2Nb_3O_{10}]$ powder is shaped into a pellet and heat-treated to provide a pellet including $K[Sr_2Nb_3O_{10}]$ layered metal oxide according to Comparative Example 1.

Comparative Example 2

$H[Sr_2Nb_3O_{10}]$ Proton Type Layered Metal Oxide $K[Sr_2Nb_3O_{10}]$ powder obtained from Comparative Example 1 is added into 5 M of a $HNO_3$ solution and stirred for 3 days and then filtered to provide $H[Sr_2Nb_3O_{10}]$ powder.

The obtained $H[Sr_2Nb_3O_{10}]$ powder is shaped into a pellet and heat-treated to provide a pellet including $H[Sr_2Nb_3O_{10}]$ proton-type metal oxide according to Comparative Example 2.

Comparative Example 3

$H[Ca_2Nb_3O_{10}]$ Proton Type Layered Metal Oxide $K[Ca_2Nb_3O_{10}]$ powder is obtained instead of $K[A^{11}_{(n-m-1)}A^{12}_{m}B'_{n}O_{3n+1}]$ in accordance with the same procedure as in Preparation Example, except that $K_2CO_3$, $CaCO_3$, $Nb_2O_5$ are mixed at 0.55:2:1.5 (mole ratio).

The obtained $K[Ca_2Nb_3O_{10}]$ powder is added into 5 M of a $HNO_3$ solution and stirred for 3 days and then filtered to provide $H[Ca_2Nb_3O_{10}]$ powder.

The obtained $H[Ca_2Nb_3O_{10}]$ powder is shaped into a pellet and heat-treated to provide a pellet including $H[Ca_2Nb_3O_{10}]$ proton-type metal oxide according to Comparative Example 3.

Comparative Example 4

$H[SrLaNb_2TiO_{10}]$ Proton Type Layered Metal Oxide $K[SrLaNb_2TiO_{10}]$ powder is obtained instead of $K[A^{11}_{(n-m-1)}A^{12}_{m}B'_{n}O_{3n+1}]$ in accordance with the same procedure as in Preparation Example, except that $K_2CO_3$, $SrCO_3$, $La_2O_3$, $Nb_2O_5$, $TiO_2$ are mixed at 0.55:1:0.5:1:1 (mole ratio).

The obtained $K[SrLaNb_2TiO_{10}]$ powder is added into 5 M of a $HNO_3$ solution and stirred for 3 days and then filtered to provide $H[SrLaNb_2TiO_{10}]$ powder.

The obtained $H[SrLaNb_2TiO_{10}]$ powder is shaped into a pellet and heat-treated to provide a pellet including $H[SrLaNb_2TiO_{10}]$ proton-type metal oxide according to Comparative Example 4.

FIG. 12 is an X-ray diffraction (XRD) graph of Examples 1 to 7 and Comparative Example 1; and FIG. 13 is a graph showing enlarged regions in which 2θ ranges from about 22° to about 34° of Examples 1, and 4 to 7 in the X-ray diffraction graph in FIG. 12.

Firstly, referring to FIG. 12, it is confirmed that Comparative Example 1 shows a similar XRD graph outline to Examples 1 to 7. Accordingly, it is confirmed that the layered metal oxides according to Examples 1 to 7 include Sr and Nb as in Comparative Example 1.

However, referring to FIG. 13, it is confirmed that the XRD peaks of Examples 6 and 7 are remarkably increased in the arrow-marked part, compared with Examples 1, 4, and 5.

FIG. 14 is a microscopic image of the layered metal oxide $K[SrBaNb_3O_{10}]$ of Example 7.

Referring to FIG. 14, it is confirmed that the layered metal oxide $K[SrBaNb_3O_{10}]$ according to Example 7 has a main phase of a first phase including the two-dimensional crystal structure, and a trace amount of a second phase having a random phase (dotted circle region in FIG. 14).

Referring to FIGS. 12 to 14, Examples 1 to 5 in which the mole number ratio of Ba occupied in the A site of Chemical Formula 1 is less than or equal to about 0.3 has only the first phase having the two-dimensional crystal structure in the layered metal oxide, but a trace amount of the second phase distinguished from the first phase is present when the mole number ratio of Ba occupied in the A site of Chemical Formula 1 is increased to greater than or equal to 0.4.

However, even in the cases of Examples 6 and 7 in which the first phase and the second phase are co-existed, the first phase is a main phase of greater than or equal to about 90 volume % in the layered metal oxide, so it is estimated that Examples 6 and 7 have minor difference in a relative permittivity from Examples 1 to 5 including 100 volume % of the first phase.

Figure 15:
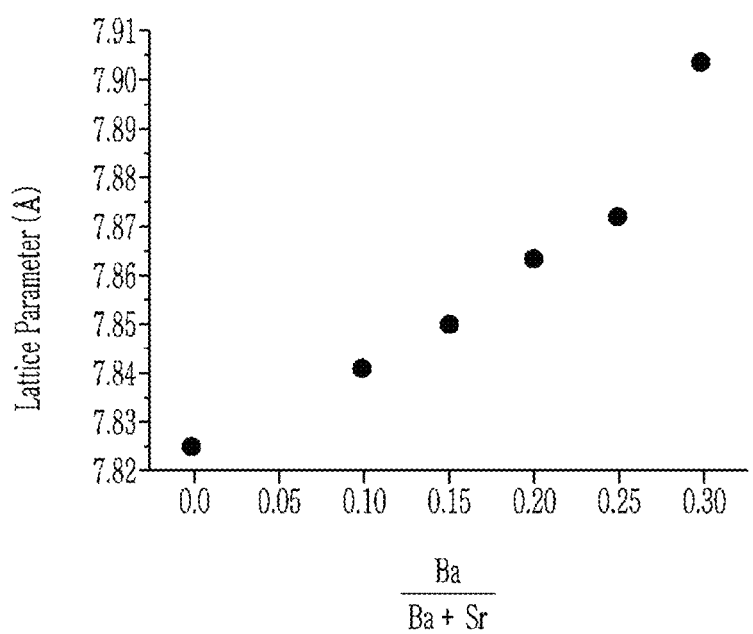
FIGS. 15 and 16 show lattice parameter changes according to a mole number ratio of Ba occupied in A site in Chemical Formula 1.
Figure 16:
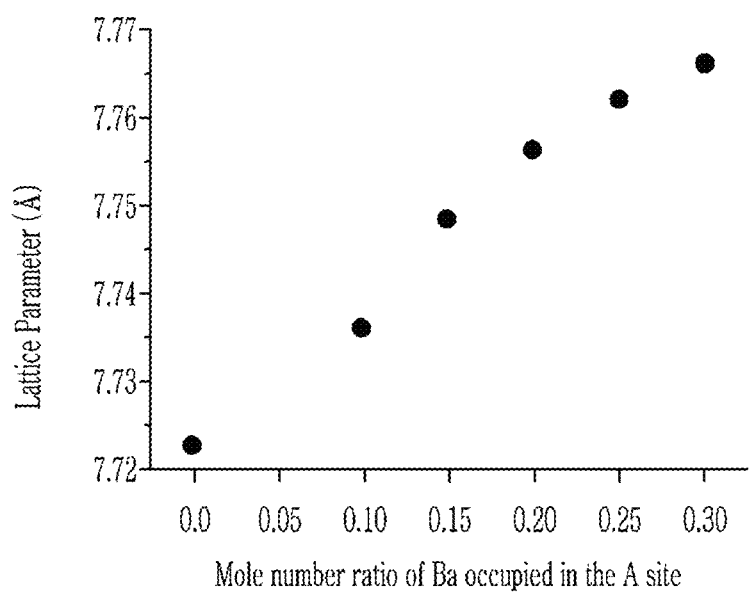

A lattice parameter of each Examples 1 to 5 and Comparative Example 1 is calculated from the XRD measurement data, the results are shown in FIGS. 15 and 16.

FIGS. 15 and 16 show the lattice parameter change according to the mole number of Ba occupied in the A site of Chemical Formula 1: FIG. 15 shows the change at x-axis of the crystal lattice; and FIG. 16 shows the change at y-axis of the crystal lattice.

Referring to FIGS. 15 and 16, the lattice parameters at both x-axis and y-axis of the crystal lattice tend to be increased according to increasing the mole number ratio of Ba occupied in the A site of Chemical Formula 1. It is estimated because the unit lattice size is tri-dimensionally increased as the mole number ratio in the A site of Ba having larger ion radius than the metal element disposed in $A^{11}$ site in Chemical Formula 1 is increased.

The obtained pellets of Examples 8 to 10 and Comparative Examples 2 to 4 are heat-treated respectively, at 1300° C. for 2 hours in an air atmosphere. Next, the relative permittivity, the dielectric loss (tan δ), and the resistivity of the heat-treated Examples 8 to 10 and Comparative Examples 2 to 4 are measured according to the measurement methods, and the results are shown in Table 1.

TABLE 1

| Compositions | | Relative permittivity | tan δ | Resistivity (Ohm · cm) |
|---|---|---|---|---|
| Example 8 | $H[Sr_{1.6}Ba_{0.4}Nb_3O_{10}]$ | 413 | 0.18 | $3.6 \times 10^{10}$ |
| Example 9 | $H[Sr_{1.8}Ba_{0.2}Nb_3O_{10}]$ | 314 | 0.03 | $5.4 \times 10^{12}$ |
| Example 10 | $H[Sr_{1.4}Ba_{0.6}Nb_3O_{10}]$ | 629 | 0.70 | $3.1 \times 10^{7}$ |
| Comparative Example 2 | $H[Sr_2Nb_3O_{10}]$ | 115 | 0.05 | $3.7 \times 10^{12}$ |
| Comparative Example 3 | $H[Ca_2Nb_3O_{10}]$ | 24 | 0.02 | $2.6 \times 10^{12}$ |
| Comparative Example 4 | $H[SrLaNb_2TiO_{10}]$ | 61 | 0.02 | $3.1 \times 10^{12}$ |

Referring to Table 1, it is confirmed that all Examples 8 to 10 have two-dimensional crystal structures caused by $[A^{11}_{(n-m-1)}A^{12}_{m}B'_{n}O_{(3n+1)}]$ of Chemical Formula 1, and the A site is divided into a $A^{11}$ site and a $A^{12}$ site, and the metal element disposed in the $A^{12}$ site may have a larger ion radius than the ion radius of the metal element disposed in the $A^{11}$ site, so it may have improved relative permittivity relative to Comparative Examples 2 to 4.

Comparing Examples 8 to 10, Example 9 in which the mole number ratio of Ba occupied in the A site is 0.1 has the best relative permittivity and dielectric loss together, and each of Examples 8 and 10 in which the mole number ratio is 0.2 and 0.3, respectively, has good relative permittivity.

The obtained pellets of Example 9, Comparative Example 2, and Comparative Example 3 are subjected to a first heat treatment at 1250° C. for 2 hours in an $H_2$(1%):$N_2$ reducing atmosphere, and followed by a secondary heat treatment at 900° C. in an air atmosphere. Next, the relative dielectric constant and specific resistance are measured according to the measurement methods, and the results are shown in Table 2.

TABLE 2

| Compositions | | Relative permittivity | Resistivity (Ohm · cm) |
|---|---|---|---|
| Example 9 | $H[Sr_{1.8}Ba_{0.2}Nb_3O_{10}]$ | 1728 | $3.5 \times 10^{11}$ |
| Comparative Example 2 | $H[Sr_2Nb_3O_{10}]$ | 654 | $5.6 \times 10^{11}$ |
| Comparative Example 3 | $H[Ca_2Nb_3O_{10}]$ | 22 | $1.2 \times 10^{12}$ |

Referring to Table 1 and Table 2, the relative permittivity of Example 9 and Comparative Example 2 to which the two-step heat treatment process above is applied exhibit significantly improved values compared to the relative permittivity of comparable examples outlined in Table 1 to which only the single heat treatment process is applied. Particularly, according to Example 9, it can be seen that the relative dielectric constant is increased by about 5.5 times as compared with the comparable example outlined in Table 1. Referring to the Table 2, the relative dielectric constant of Example 9 is about 80 times greater than that of the Comparative Examples.

The two-step heat treatment process previously described with reference to Table 2 are processed the same except for the secondary heat treatment temperature of Example 9 changed from 900° C. to 700° C., and 800° C., respectively. The results are shown in Table 3 together with the case in which the secondary heat treatment temperature is 900° C.

TABLE 3

| Compositions | | secondary heat treatment temperature (° C.) | Relative permittivity | Resistivity (Ohm · cm) |
|---|---|---|---|---|
| Example 9 | H[Sr$_{1.8}$Ba$_{0.2}$Nb$_3$O$_{10}$] | 900 | 1728 | 3.5 × 10$^{11}$ |
| | | 800 | 1979 | 4.1 × 10$^{10}$ |
| | | 700 | 2609 | 4.1 × 10$^9$ |

Referring to Tables 2 and 3, even when the secondary heat treatment temperature of the H[Sr$_{1.8}$Ba$_{0.2}$Nb$_3$O$_{10}$] pellets according to Example 9 is varied from 700° C. to 900° C., the maximum of the relative permittivity values are about 120 times greater than that of Comparative Examples which are shown in Table 2.

In the Table 3, as the secondary heat treatment temperature gradually increases from 700° C. to 900° C., the relative permittivity gradually decreases, and the resistivity gradually increases at the same time. Therefore, the two-dimensional perovskite material having improved relative dielectric constant and high resistivity at the same time may be provided by appropriately controlling the detailed heat treatment process conditions.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A two-dimensional perovskite material, comprising
a layered metal oxide comprising a first layer having a positive charge and a second layer having a negative charge which are laminated, a monolayer nanosheet exfoliated from the layered metal oxide, a nanosheet laminate of a plurality of the monolayer nanosheets, or a combination thereof,
wherein the two-dimensional perovskite material comprises about 80 volume % or greater of a first phase having a two-dimensional crystal structure, based on 100 volume % of the two-dimensional perovskite material, and
the two-dimensional perovskite material is represented by Chemical Formula 1

$X[A^{11}_{(n-m-1)}A^{12}_m B'_n O_{(3n+1)}]$  Chemical Formula 1 wherein, in Chemical Formula 1,
X comprises H, Li, Na, K, Rb, Cs, a cationic compound, or a combination thereof,
each of A$^{11}$ and A$^{12}$ comprises a metal element having +2 to +3 valence, each of A$^{11}$ and A$^{12}$ comprises Be, Mg, Sr, Ba, Ra, Pb, La, Ce, Pr, Sm, Eu, Gd, Tb, Dy, Ho, Er, Tm, Yb, Lu, or a combination thereof, and wherein A$^{12}$ has a larger ion radius than A$^{11}$,
B' comprises Nb, V, Ta, Ti, Zr, Hf, W, Mo, Cr, Pb, Sn, or a combination thereof,
n≥3,
m>0, and
provided that
X comprises H, Li, Rb, Cs, or a combination thereof;
at least one of A$^{11}$ and A$^{12}$ is Be, Mg, Ba, Ra, Pb, Tb, Dy, Ho, Er, Tm, Yb, Lu, or a combination thereof;
B' comprises V, Ta, Ti, Zr, Hf, W, Mo, Cr, Pb, Sn, or a combination thereof; or
a combination thereof.

2. The two-dimensional perovskite material of claim 1, wherein the two-dimensional perovskite material is represented by Chemical Formula 2c:

$X[A^{41}_{(2-m)}A^{42}_m B'_{3whe} O_{10}]$  Chemical Formula 2c wherein, in Chemical Formula 2c, X and B' are the same as in Chemical Formula 1,
each of A$^{41}$ and A$^{42}$ comprises Be, Mg, Sr, Ba, Ra, Pb, La, Ce, Pr, Sm, Eu, Gd, Tb, Dy, Ho, Er, Tm, Yb, Lu, or a combination thereof, wherein A$^{42}$ has a larger ion radius than A$^{41}$, and
0<m≤1.

3. The two-dimensional perovskite material of claim 1, wherein the first phase is a Dion-Jacobson phase.

4. The two-dimensional perovskite material of claim 1, wherein the first layer of the layered metal oxide comprises a proton, an alkali metal ion, or a combination thereof.

5. The two-dimensional perovskite material of claim 1, wherein the monolayer nanosheet comprises the second layer exfoliated from the layered metal oxide.

6. The two-dimensional perovskite material of claim 5, wherein the monolayer nanosheet comprises the cationic compound attached to a surface of the second layer.

7. The two-dimensional perovskite material of claim 1, wherein a thickness of the monolayer nanosheet is less than or equal to about 10 nanometers.

8. The two-dimensional perovskite material of claim 1, wherein the average longitudinal diameter of the monolayer nanosheet is about 10 nanometers to about 100 micrometers.

9. The two-dimensional perovskite material of claim 1, wherein the two-dimensional perovskite material has a relative permittivity of greater than or equal to about 200 at 1 kilohertz (kHz).

10. A two-dimensional perovskite material, comprising
a layered metal oxide comprising a first layer having a positive charge and a second layer having a negative charge which are laminated, a monolayer nanosheet exfoliated from the layered metal oxide, a nanosheet laminate of a plurality of the monolayer nanosheets, or a combination thereof,
wherein the two-dimensional perovskite material comprises about 80 volume % or greater of a first phase having a two-dimensional crystal structure, based on 100 volume % of the two-dimensional perovskite material, and
the two-dimensional perovskite material is represented by Chemical Formula 2a:

$X[A^{21}_{(n-m-1)}Ba_m B'_n O_{(3n+1)}]$  Chemical Formula 2a wherein, in Chemical Formula 2a,
X comprises H, Li, Na, K, Rb, Cs, a cationic compound, or a combination thereof,
A$^{21}$ comprises Be, Mg, Sr, Ra, Pb, La, Ce, Pr, Sm, Eu, Gd, Tb, Dy, Ho, Er, Tm, Yb, Lu, or a combination thereof,
B' comprises Nb, V, Ta, Ti, Zr, Hf, W, Mo, Cr, Pb, Sn, or a combination thereof,
n≥3, and
0<m≤1.

11. A two-dimensional perovskite material of claim 1, comprising
a layered metal oxide comprising a first layer having a positive charge and a second layer having a negative charge which are laminated, a monolayer nanosheet exfoliated from the layered metal oxide, a nanosheet laminate of a plurality of the monolayer nanosheets, or a combination thereof, wherein the two-dimensional perovskite material comprises about 80 volume % or greater of a first phase having a two-dimensional crystal structure, based on 100 volume % of the two-dimensional perovskite material, and the two-dimensional perovskite material is represented by Chemical Formula 2b:

$$X[Sr_{(n-m-1)}A^{32}{}_mB'_nO_{(3n+1)}] \qquad \text{Chemical Formula 2b}$$

wherein, in Chemical Formula 2b,

X comprises H, Li, Na, K, Rb, Cs, a cationic compound, or a combination thereof, $A^{32}$ comprises Ba, Pb, or a combination thereof, B' comprises Nb, V, Ta, Ti, Zr, Hf, W, Mo, Cr, Pb, Sn, or a combination thereof, $n \geq 3$, and $0 < m \leq 1$.

12. A two-dimensional perovskite material, comprising a layered metal oxide comprising a first layer having a positive charge and a second layer having a negative charge which are laminated, a monolayer nanosheet exfoliated from the layered metal oxide, a nanosheet laminate of a plurality of the monolayer nanosheets, or a combination thereof, wherein the two-dimensional perovskite material comprises about 80 volume % or greater of a first phase having a two-dimensional crystal structure, based on 100 volume % of the two-dimensional perovskite material, and the two-dimensional perovskite material is represented by Chemical Formula 1

$$X[A^{11}{}_{(n-m-1)}A^{12}{}_mB'_nO_{(3n+1)}] \qquad \text{Chemical Formula 1}$$

wherein, in Chemical Formula 1, each of $A^{11}$ and $A^{12}$ comprises a metal element having +2 to +3 valence, each of $A^{11}$ and $A^{12}$ comprises Be, Mg, Sr, Ba, Ra, Pb, La, Ce, Pr, Sm, Eu, Gd, Tb, Dy, Ho, Er, Tm, Yb, Lu, or a combination thereof, and wherein $A^{12}$ has a larger ion radius than $A^{11}$, B' comprises Nb, V, Ta, Ti, Zr, Hf, W, Mo, Cr, Pb, Sn, or a combination thereof, $n \geq 3$, $m > 0$, and $n - m \neq 1$, and wherein X comprises a cationic compound, and the cationic compound comprises a (C1 to C16 alkyl)ammonium compound, a (C1 to C16 alkyl)amine compound, or a combination thereof.

13. The two-dimensional perovskite material of claim 12, wherein the cationic compound comprises a tetramethyl ammonium compound, a tetraethyl ammonium compound, a tetrapropyl ammonium compound, a tetrabutyl ammonium compound, a methylamine compound, an ethylamine compound, a propylamine compound, a butylamine compound, or a combination thereof.

14. A dielectric material comprising a plurality of crystal grains comprising a semi-conductor or conductive material; and a grain boundary insulation layer between the crystal grains; wherein the grain boundary insulation layer covers at least one portion of a surface of at least one of the crystal grains and comprises a two-dimensional perovskite material of claim 1.

15. The dielectric material of claim 14, wherein the two-dimensional perovskite material covers an entire surface of the crystal grain.

16. The dielectric material of claim 14, wherein the cationic compound comprises a (C1 to C16 alkyl)ammonium, a (C1 to C16 alkyl)amine compound, or a combination thereof.

17. The dielectric material of claim 14, wherein the two-dimensional perovskite material is present in an amount of about 10 volume % to about 100 volume %, based on 100 volume % of the grain boundary insulation layer.

18. The dielectric material of claim 14, wherein the crystal grain comprises a barium titanate, a strontium titanate, a lead titanate, a lead zirconate, a lead zirconate titanate, or a combination thereof.

19. A multi-layered capacitor comprising a laminate structure comprising an internal electrode and a dielectric layer, where in the dielectric layer comprises a dielectric material comprising a plurality of crystal grains comprising a semi-conductor or conductive material; and a grain boundary insulation layer between the crystal grains, and the multi-layered capacitor comprises a two-dimensional perovskite material of claim 1.

20. The multi-layered capacitor of claim 19, wherein at least two layers of each of the internal electrode and the dielectric layer are alternated and laminated.

21. The multi-layered capacitor of claim 19, wherein the dielectric layer has a thickness of less than about 500 nanometers.

22. The multi-layered capacitor of claim 21, wherein the dielectric layer has a relative permittivity of greater than or equal to about 4,000.

* * * * *